US008681433B2

(12) United States Patent
Ono

(10) Patent No.: US 8,681,433 B2
(45) Date of Patent: Mar. 25, 2014

(54) VARIABLE MAGNIFICATION OPTICAL SYSTEM AND IMAGING APPARATUS

(71) Applicant: Fujifilm Corporation, Tokyo (JP)

(72) Inventor: Kazunori Ono, Saitama-ken (JP)

(73) Assignee: Fujifilm Corporation, Tokyo (JP)

( * ) Notice: Subject to any disclaimer, the term of this patent is extended or adjusted under 35 U.S.C. 154(b) by 0 days.

(21) Appl. No.: 13/971,871

(22) Filed: Aug. 21, 2013

(65) Prior Publication Data

US 2013/0335831 A1    Dec. 19, 2013

Related U.S. Application Data

(63) Continuation of application No. PCT/JP2012/001519, filed on Mar. 6, 2012.

(30) Foreign Application Priority Data

Mar. 10, 2011  (JP) .................................. 2011-052728

(51) Int. Cl.
*G02B 15/14* (2006.01)

(52) U.S. Cl.
USPC .......................................... 359/687; 359/684

(58) Field of Classification Search
USPC .................................. 359/687, 684
See application file for complete search history.

(56) References Cited

U.S. PATENT DOCUMENTS

| | | | |
|---|---|---|---|
| 6,587,281 B2 | 7/2003 | Hozumi et al. | |
| 6,788,474 B2 | 9/2004 | Hozumi et al. | |
| 7,139,130 B2 | 11/2006 | Yamada | |
| 7,835,084 B2 | 11/2010 | Miyazawa | |
| 2010/0103532 A1* | 4/2010 | Saito | 359/687 |
| 2010/0238562 A1 | 9/2010 | Take | |

FOREIGN PATENT DOCUMENTS

| | | |
|---|---|---|
| JP | 08-248318 | 9/1996 |
| JP | 2001-091830 | 4/2001 |
| JP | 2001-221948 | 8/2001 |
| JP | 2001-356268 | 12/2001 |
| JP | 2003-295055 | 10/2003 |
| JP | 2005-128186 | 5/2005 |
| JP | 2006-113111 | 4/2006 |
| JP | 2007-298831 | 11/2007 |
| JP | 2008-310222 | 12/2008 |
| JP | 2009-180897 | 8/2009 |
| JP | 2009-204942 | 9/2009 |
| JP | 2010-102096 | 5/2010 |
| JP | 2010-145759 | 7/2010 |

OTHER PUBLICATIONS

International Search Report PCT/JP2012/001519 dated Jul. 10, 2012.

\* cited by examiner

*Primary Examiner* — Alicia M Harrington
(74) *Attorney, Agent, or Firm* — Young & Thompson

(57) ABSTRACT

A variable magnification optical system includes a positive first lens group, a negative second lens group, a stop, a positive third lens group and a positive fourth lens group, which are in this order from an object side. The first lens group, the stop and the third lens group are fixed, but the second lens group and the fourth lens group move in an optical axis direction during magnification change. The fourth lens group has a focusing function. The third lens group includes at least an aspherical surface, and consists of, in the following order from the object side, a positive lens and a cemented lens of a positive lens and a double-concave lens cemented together. The variable magnification optical system satisfies a predetermined formula.

9 Claims, 21 Drawing Sheets

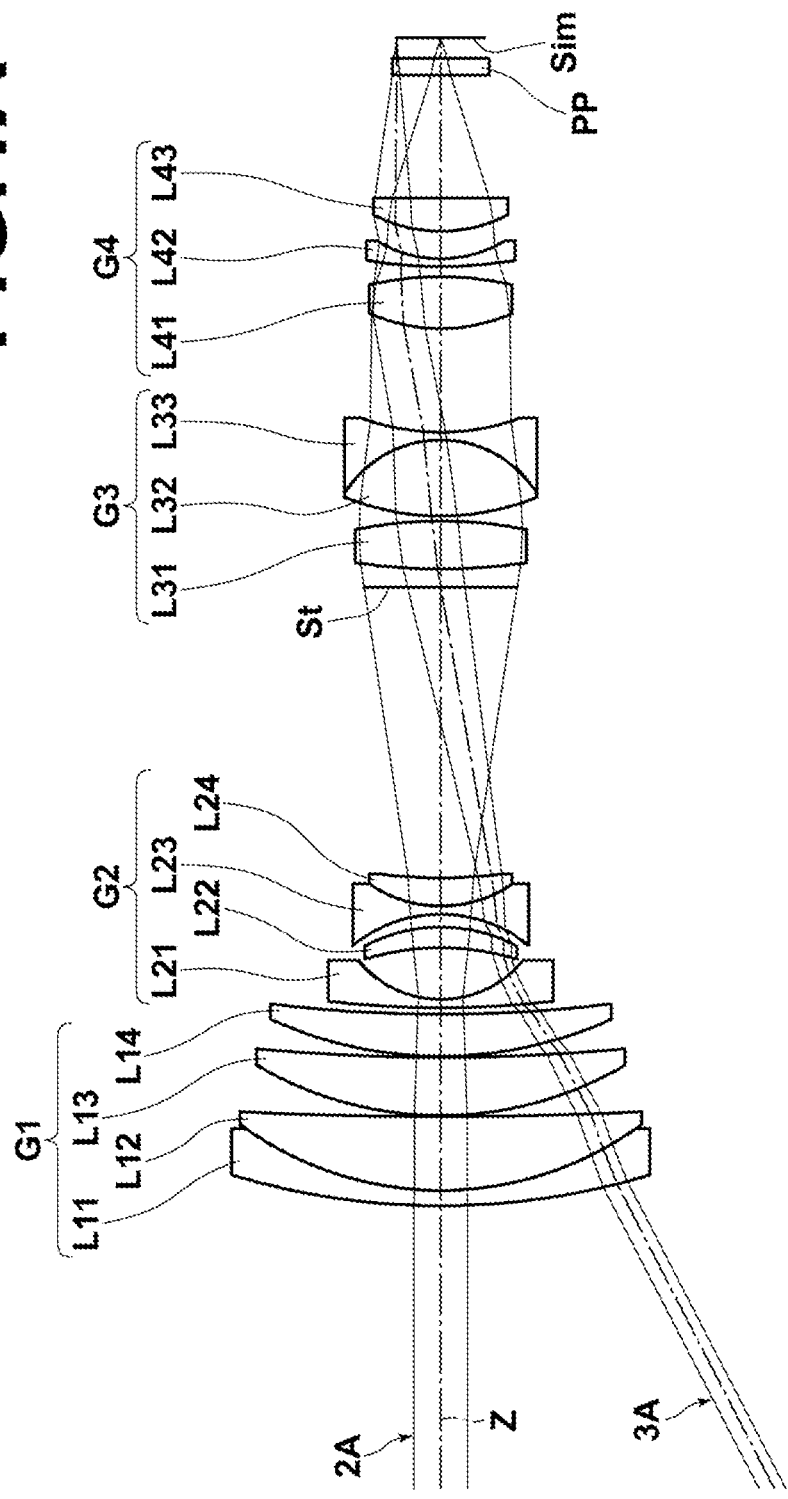

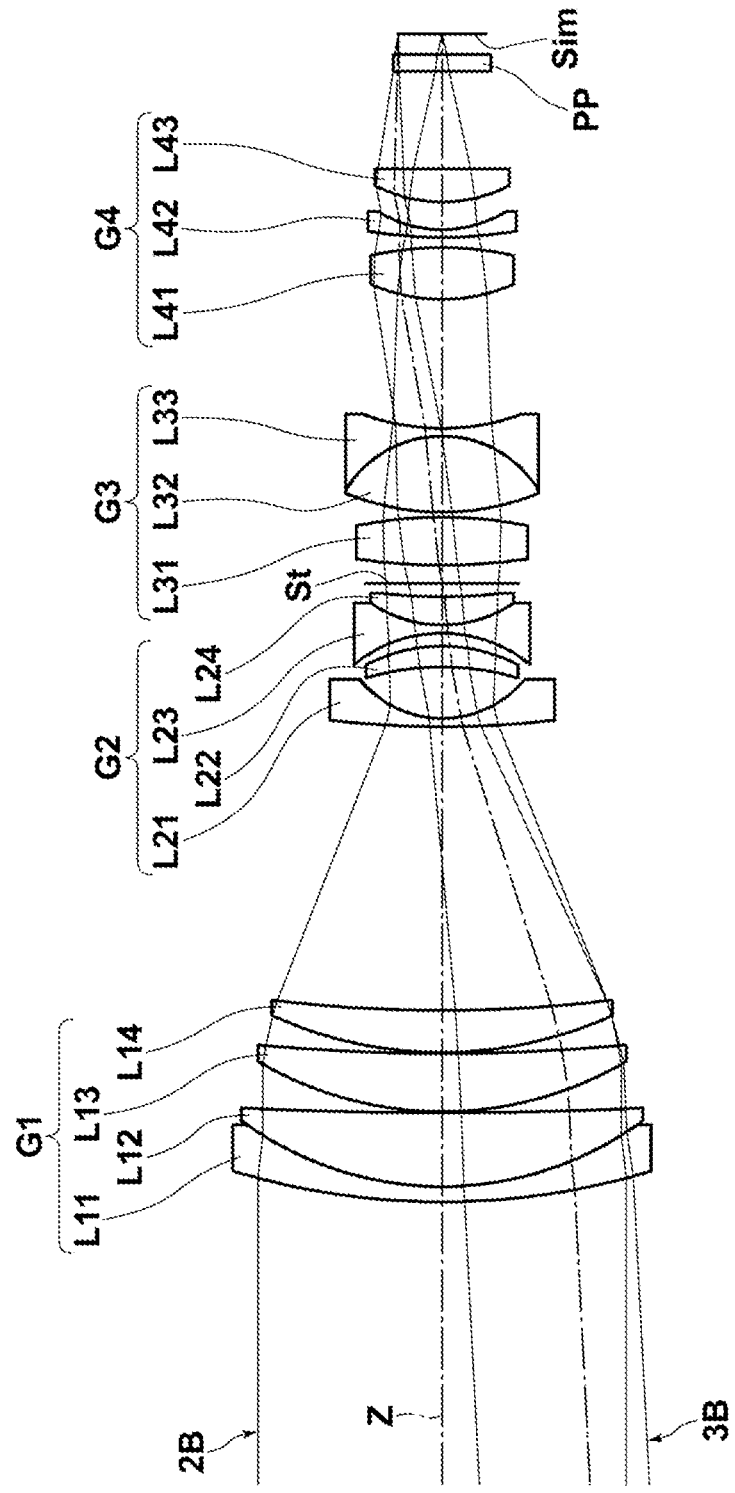

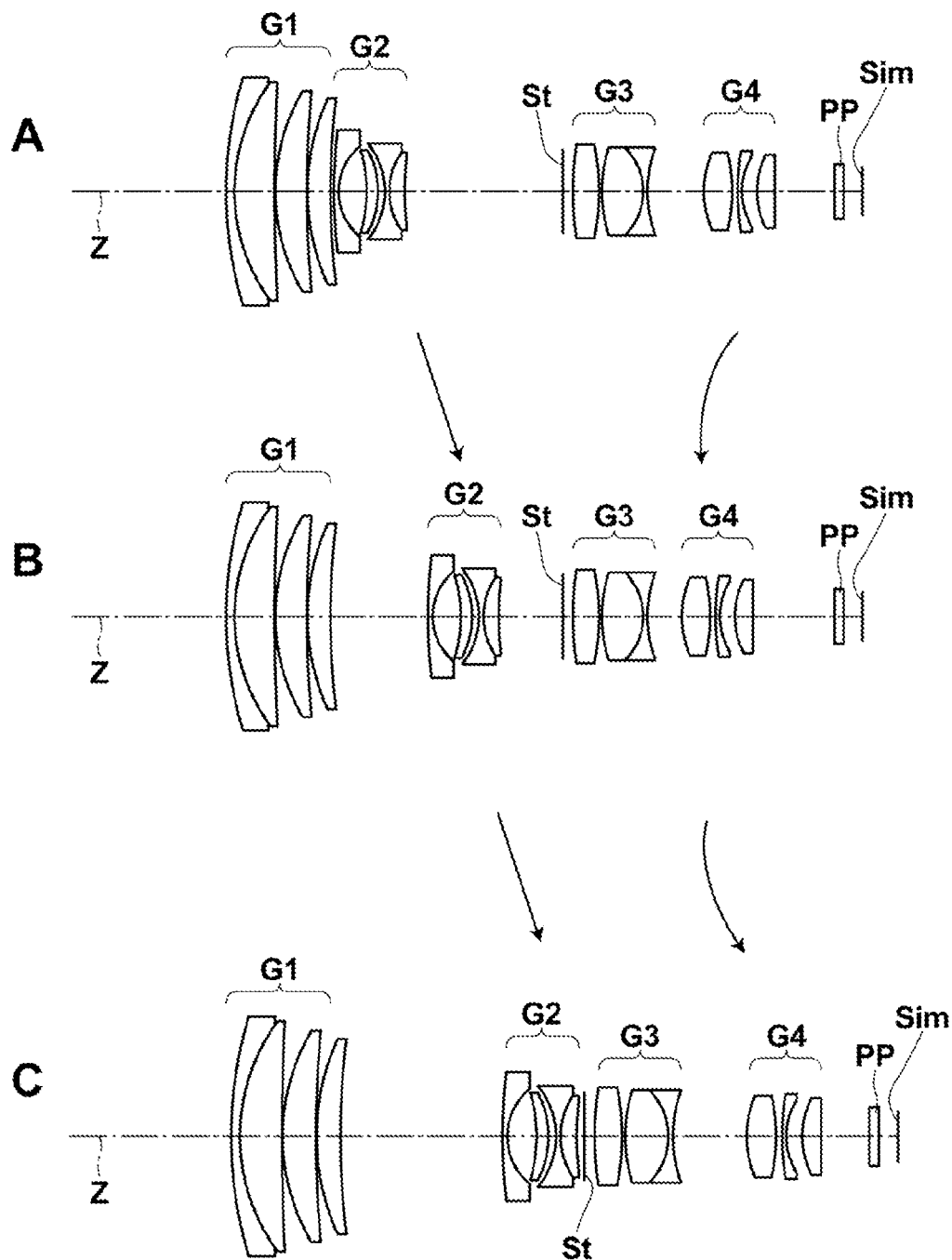

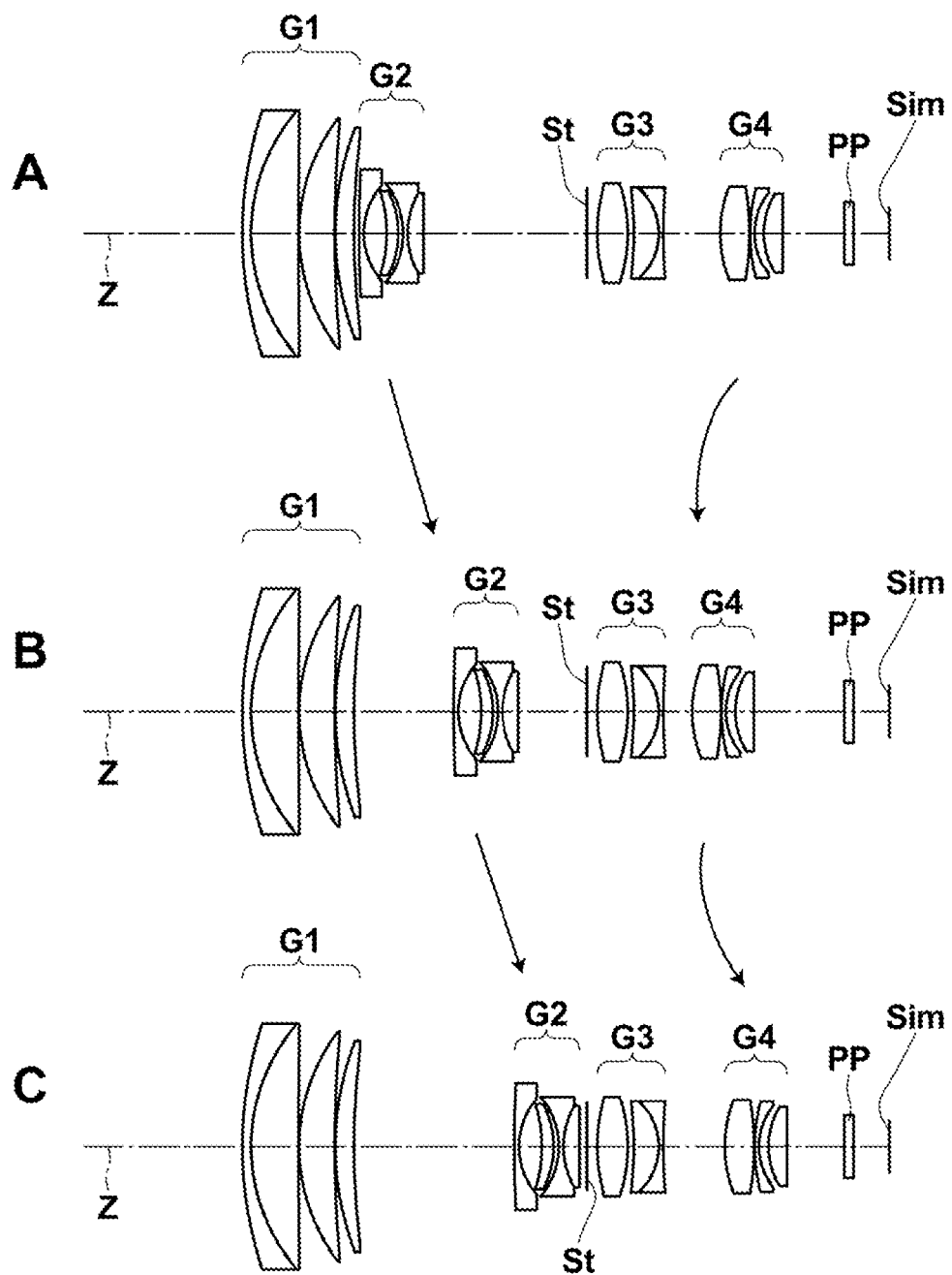

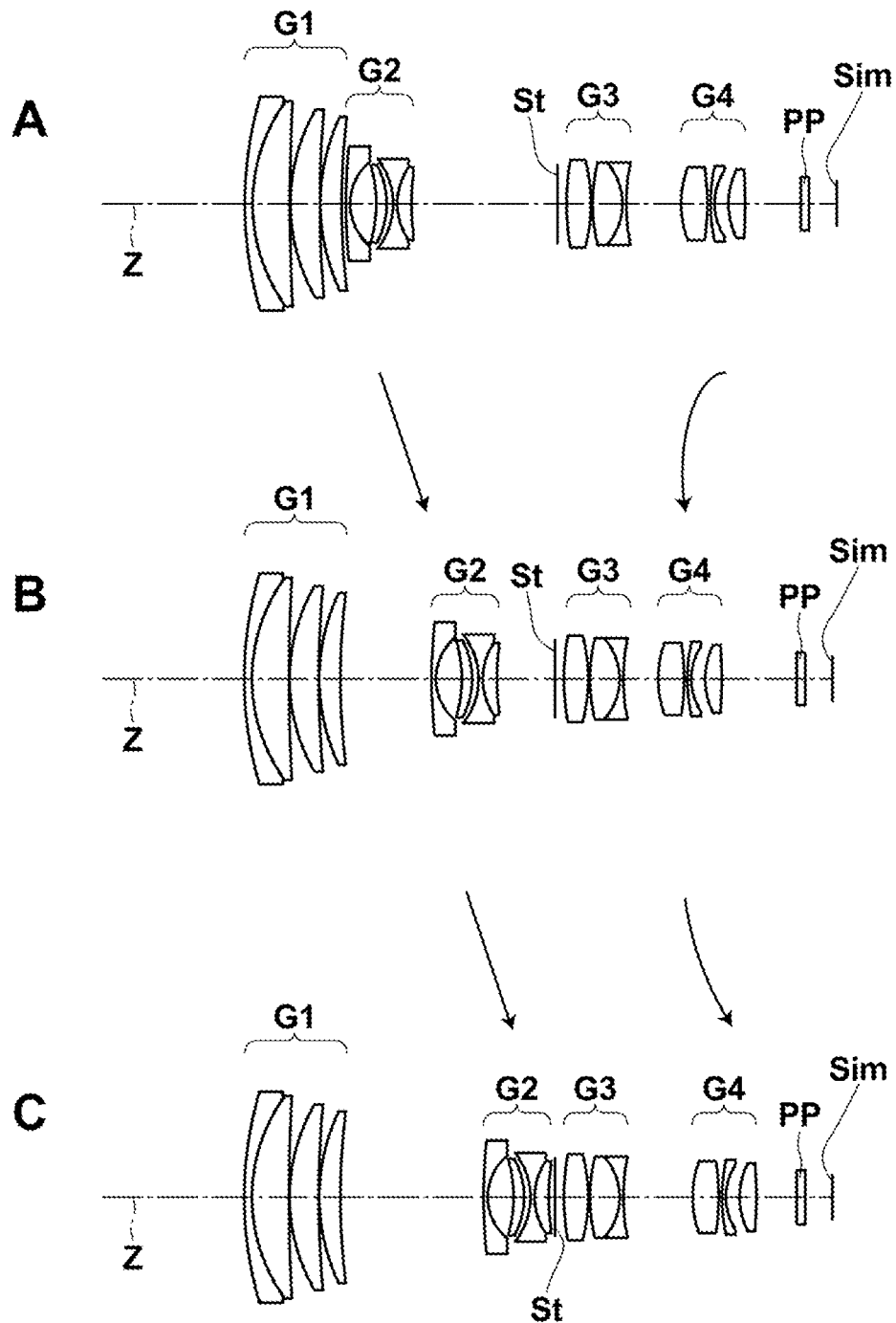
FIG.4  EXAMPLE 3

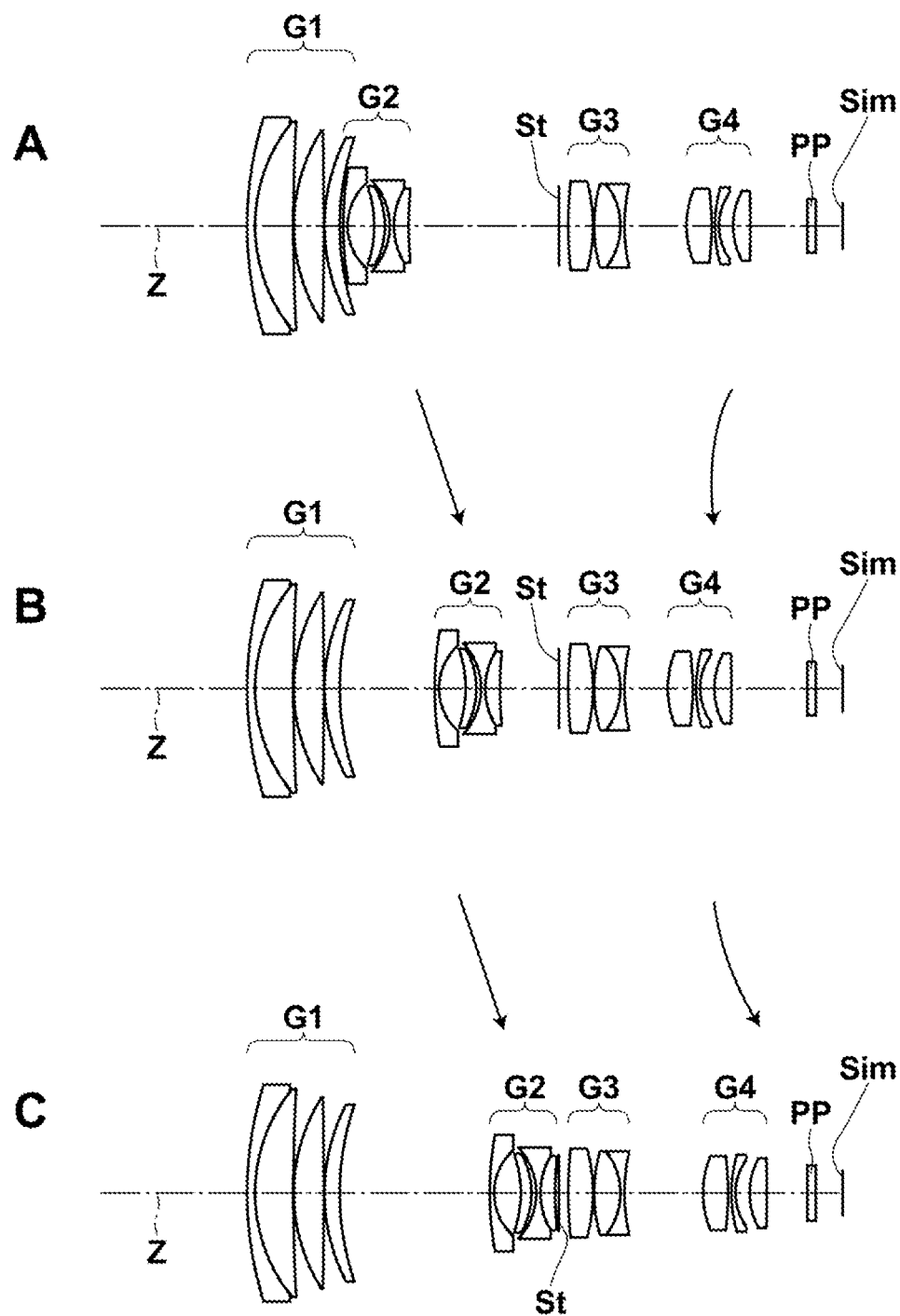
FIG.5 EXAMPLE 4

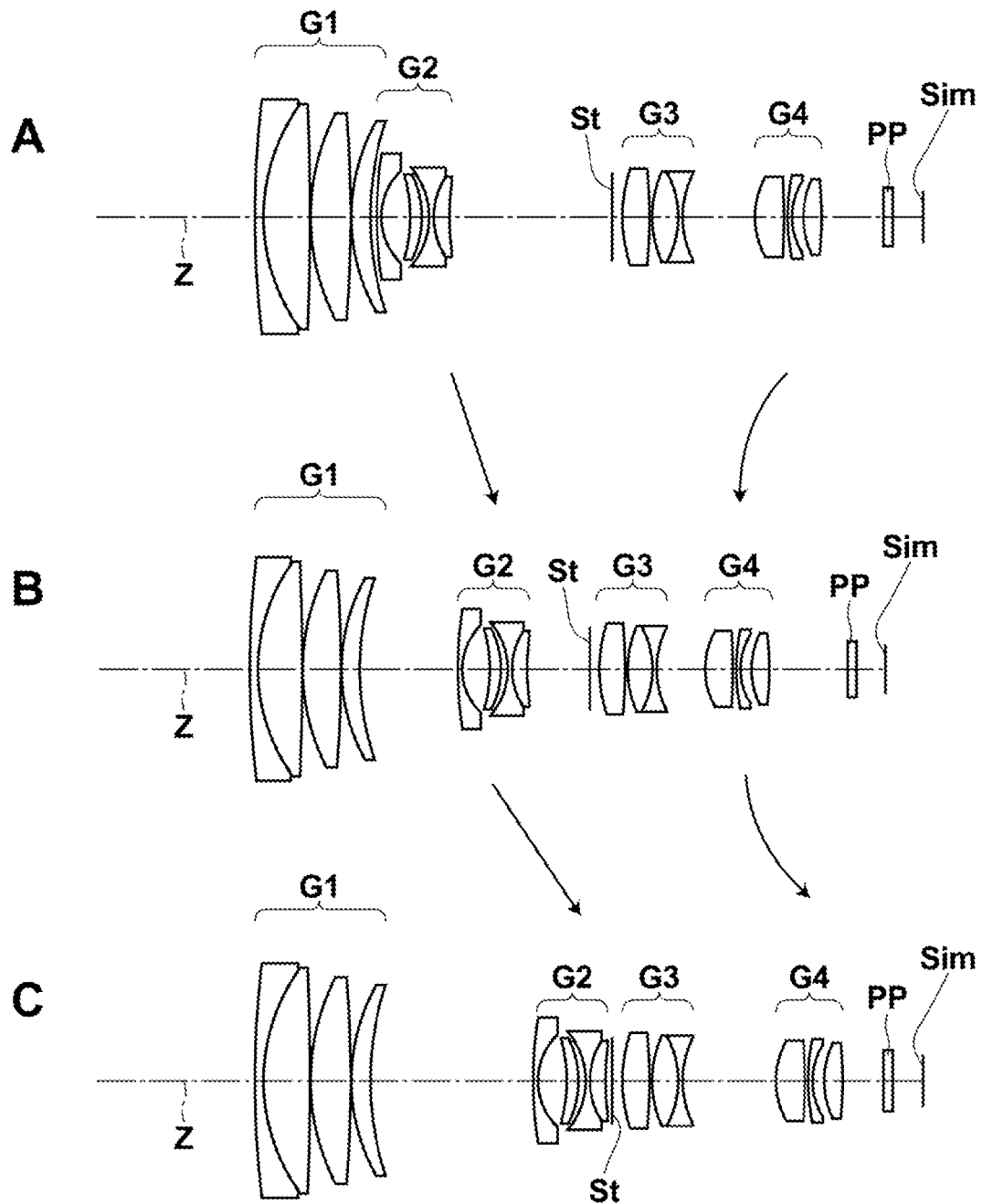

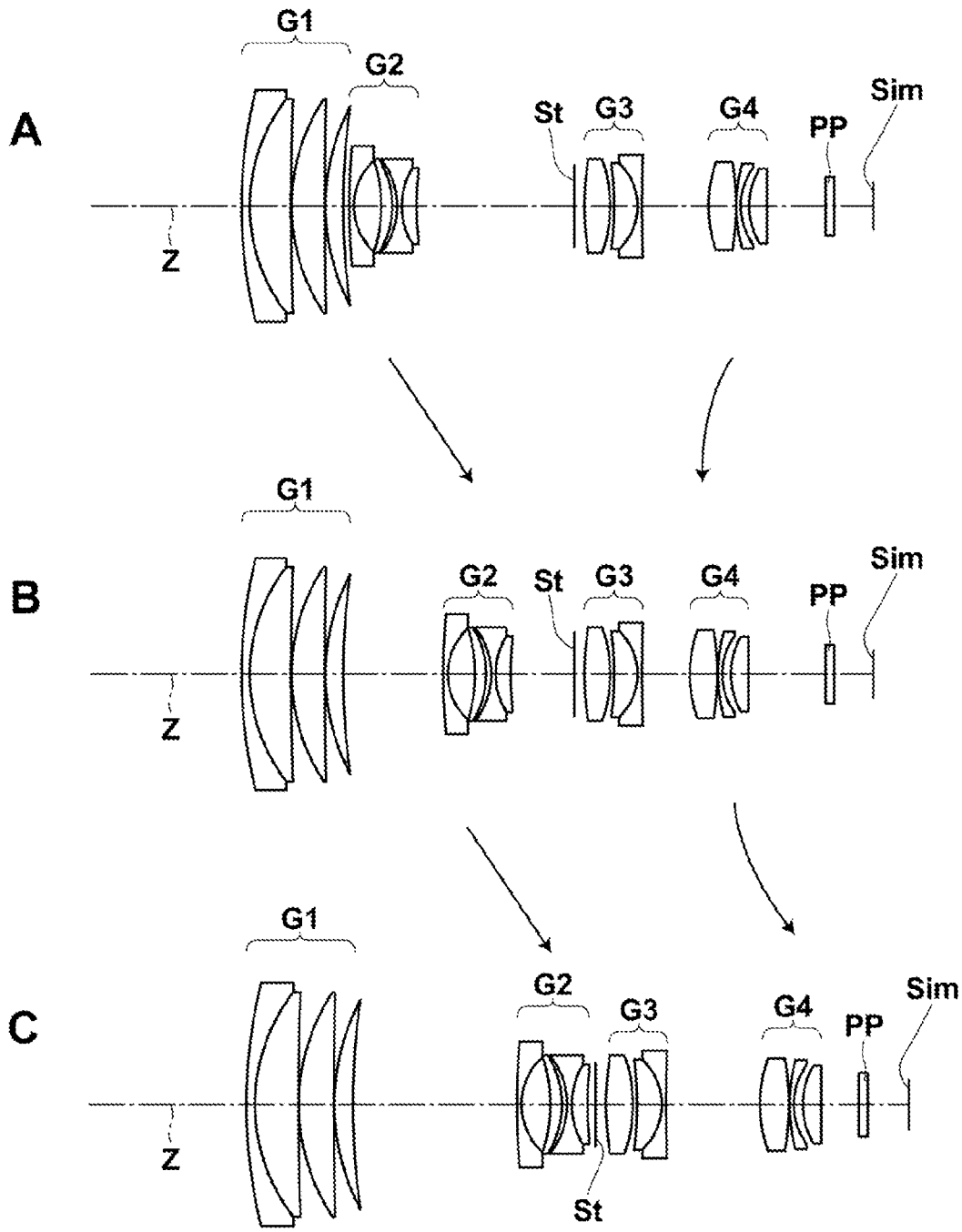

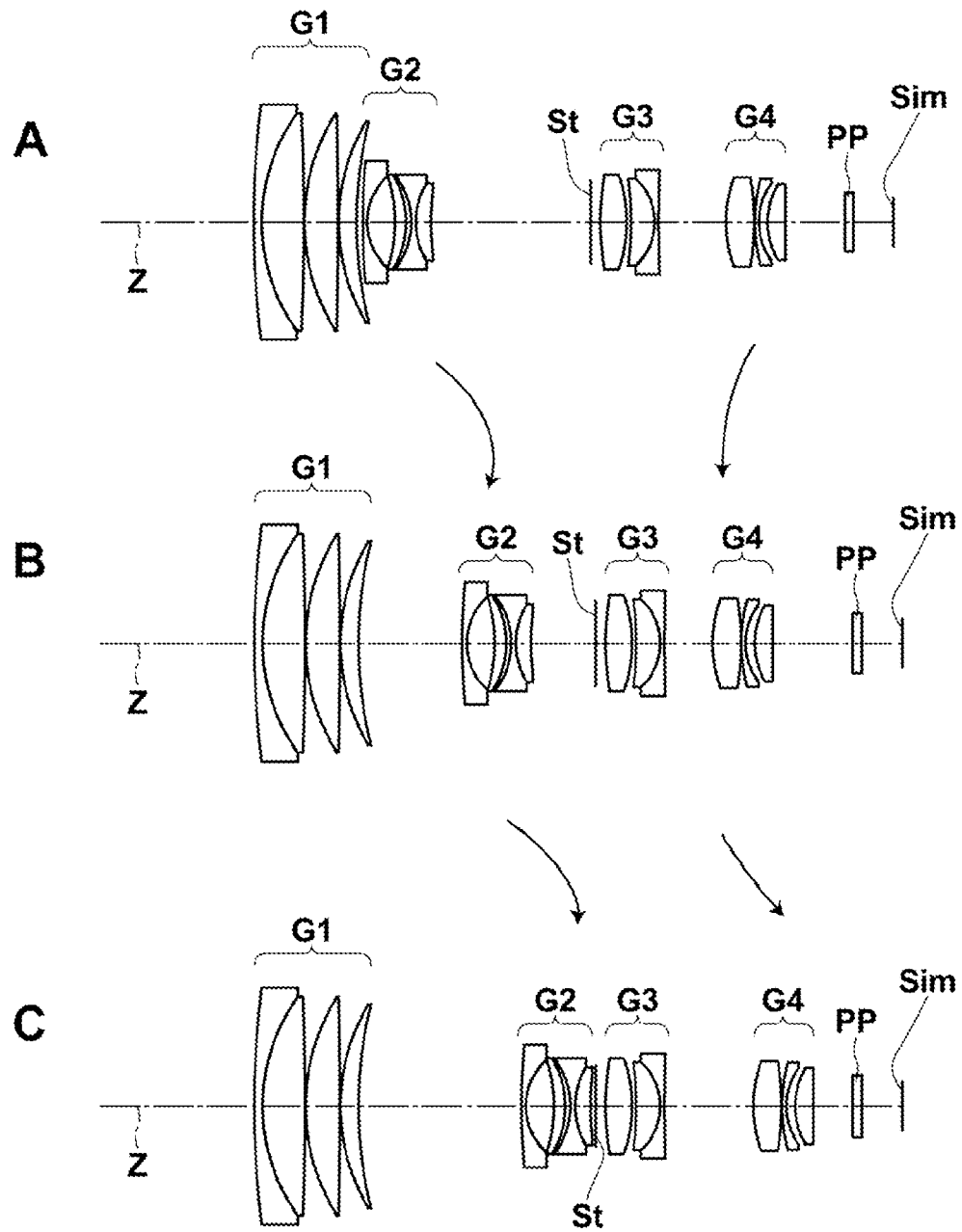
FIG.8  EXAMPLE 7

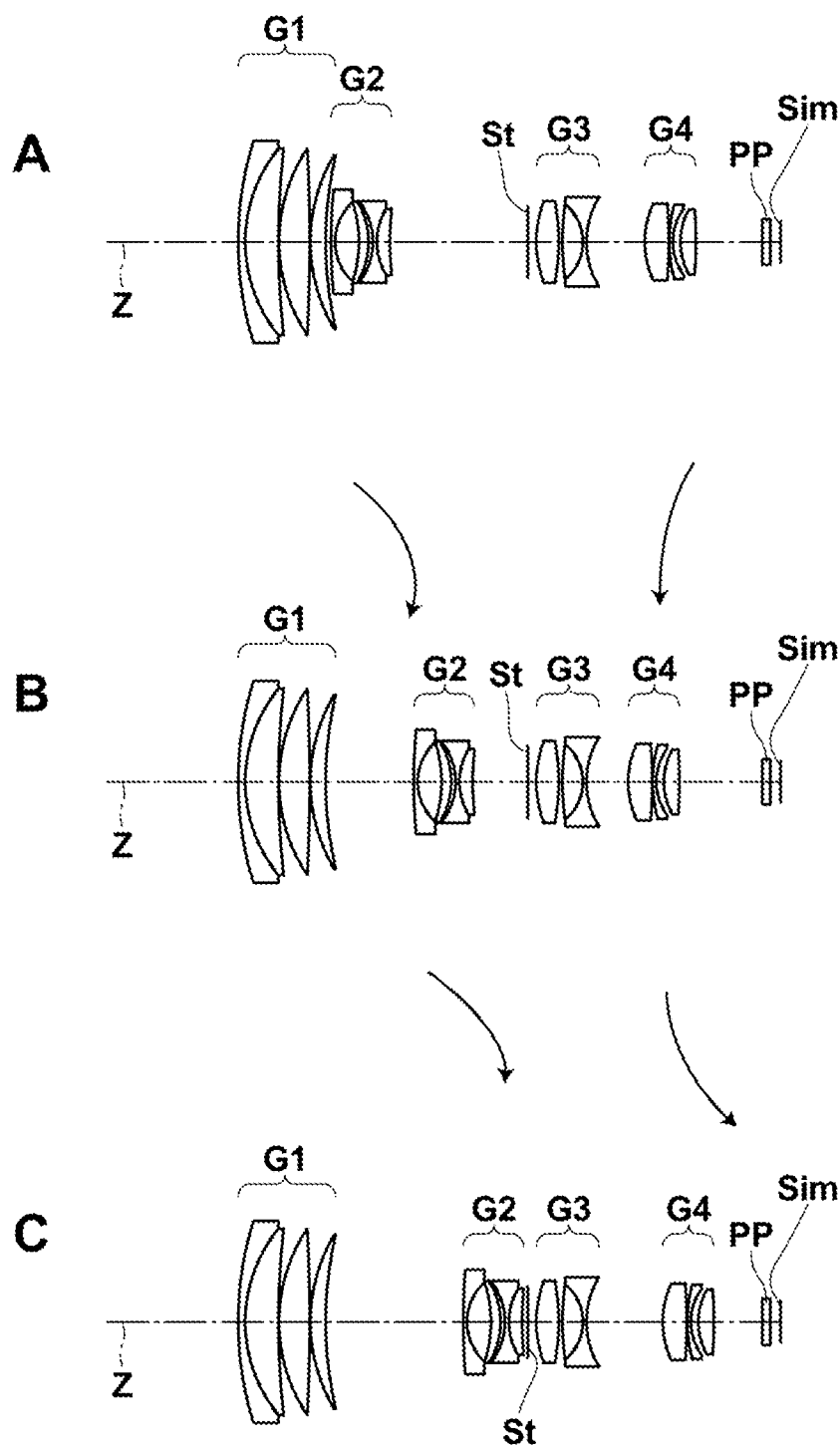
FIG.9 EXAMPLE 8

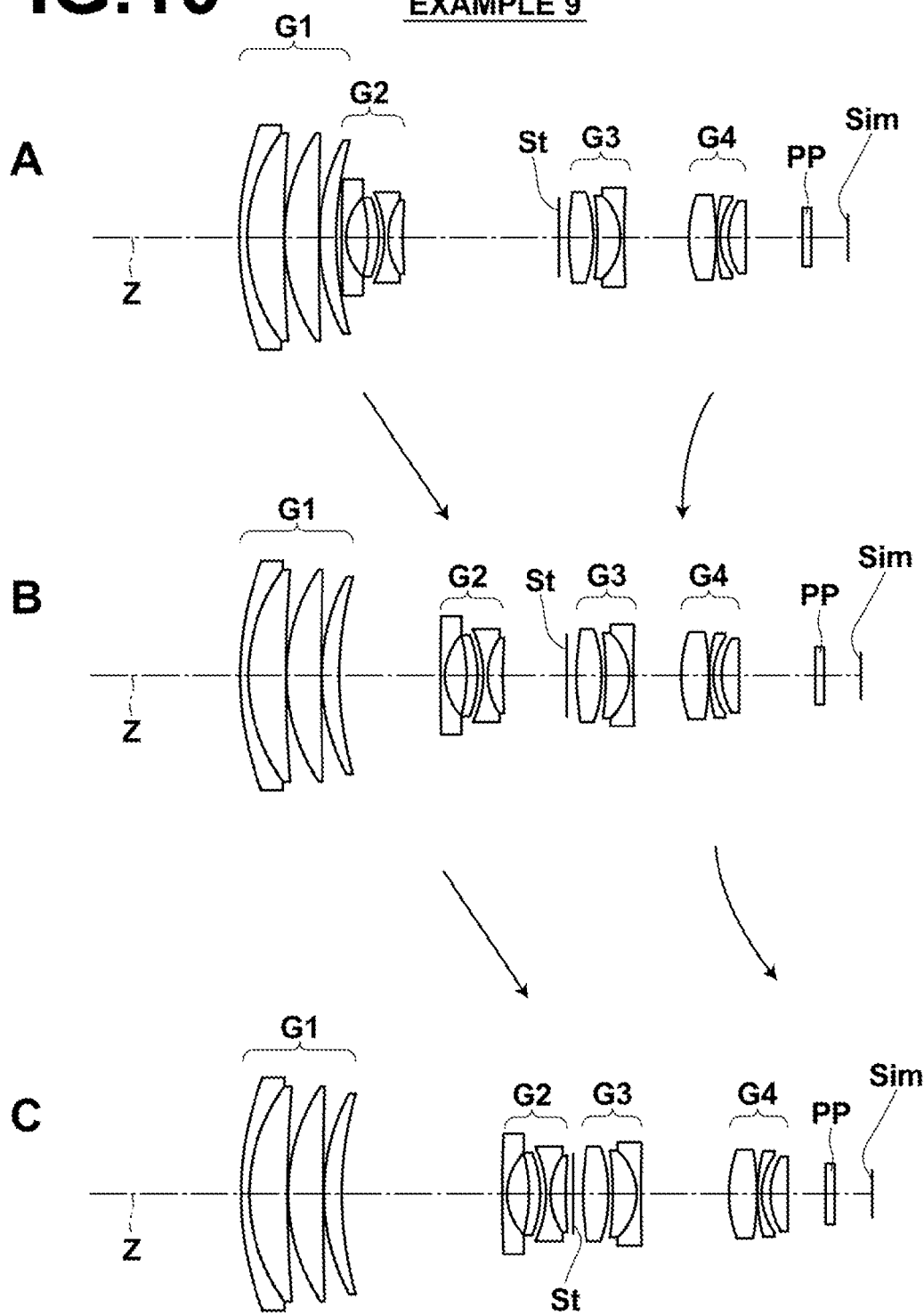

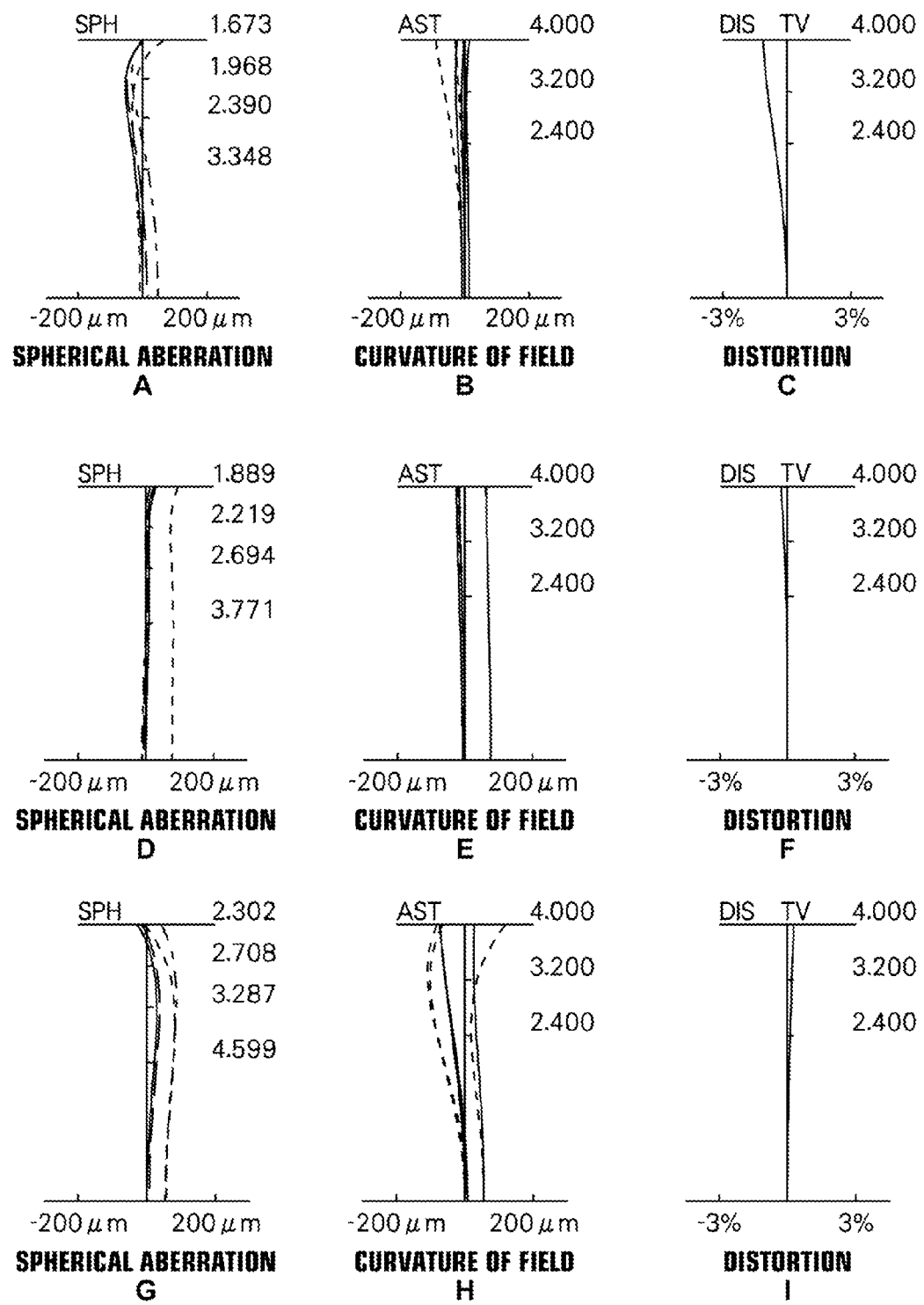
FIG.11 EXAMPLE 1

FIG.12
EXAMPLE 2
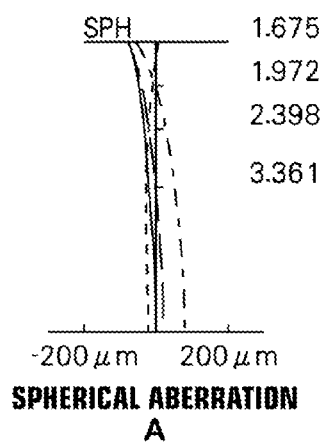
SPHERICAL ABERRATION
A
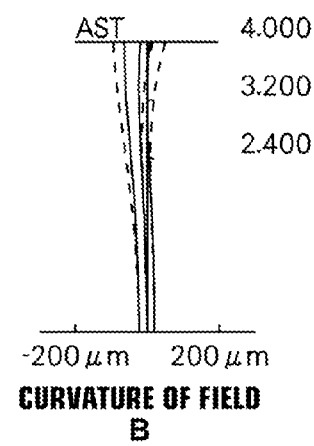
CURVATURE OF FIELD
B
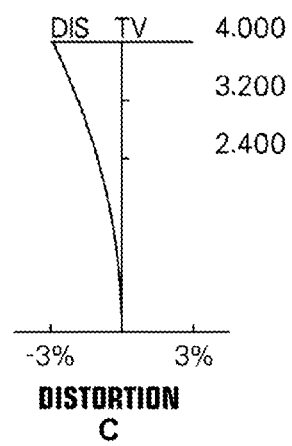
DISTORTION
C
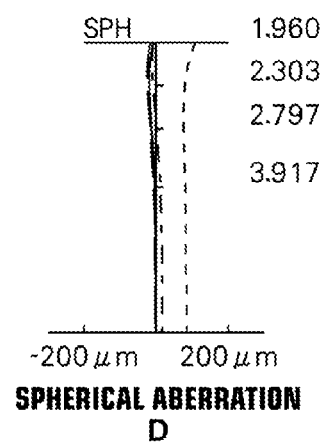
SPHERICAL ABERRATION
D
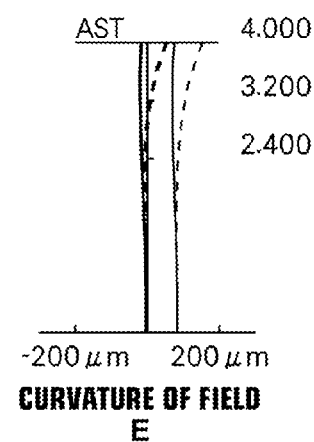
CURVATURE OF FIELD
E
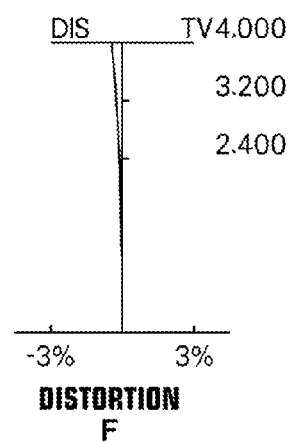
DISTORTION
F
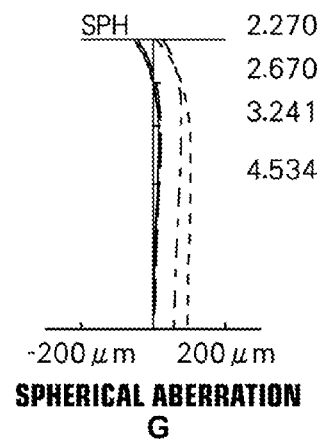
SPHERICAL ABERRATION
G
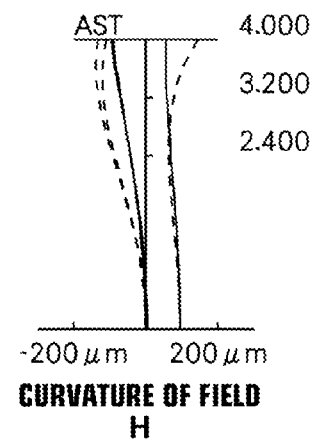
CURVATURE OF FIELD
H
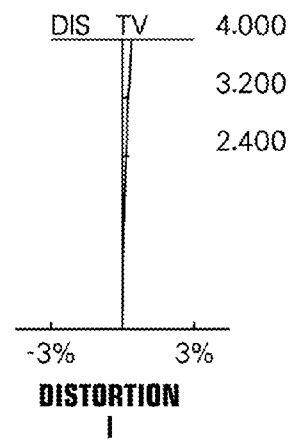
DISTORTION
I

FIG.15  EXAMPLE 5

FIG.16  EXAMPLE 6

EXAMPLE 8

FIG.19  EXAMPLE 9

VARIABLE MAGNIFICATION OPTICAL SYSTEM AND IMAGING APPARATUS

BACKGROUND OF THE INVENTION

1. Field of the Invention

The present invention relates to a variable magnification optical system used in a video camera, an electronic still camera or the like, and an imaging apparatus. In particular, the present invention relates to a variable magnification optical system that is especially appropriate for a surveillance camera, and which can be used both in a visible wavelength band and in a near-infrared wavelength band, and an imaging apparatus including the variable magnification optical system.

2. Description of the Related Art

Conventionally, a variable magnification optical system for CCTV (Closed-circuit Television) has been developed, as an optical system used in an imaging apparatus, such as a video camera, an electronic still camera and a surveillance camera, which uses an imaging device, such as a CCD (Charge Coupled Device) and a CMOS (Complementary Metal Oxide Semiconductor), as a recording medium. As such a variable magnification optical system for CCTV, a system consisting of four groups has many advantages, such as the simplicity of barrel-variable magnification mechanisms and the easiness of handling, and many optical systems of such a kind have been proposed.

For example, Japanese Patent No. 4454731 (Patent Document 1) and Japanese Unexamined Patent Publication No. 2003-295055 (Patent Document 2) disclose four-group zoom lenses. The four-group zoom lens consists of a first lens group, a second lens group, a stop, a third lens group and a fourth lens group, which are in this order from the object side. The first lens group has positive refractive power, and is fixed during magnification change. The second lens group has negative refractive power, and moves in an optical axis direction during magnification change. The stop is fixed during magnification change. The third lens group has positive refractive power, and is fixed during magnification change. The fourth lens group has positive refractive power, and moves in an optical axis direction to focus during magnification change.

SUMMARY OF THE INVENTION

Meanwhile, since a market for surveillance cameras sharply expanded in recent years, competition in development of surveillance cameras has become fierce. Meanwhile, a lens system that satisfies various favorable factors, such as a large relative aperture, so that the lens system is usable even in low-illumination photography conditions, and that has high performance, and that is small and structured at low cost, is requested. Further, the lens system for the surveillance camera needs to be usable both in a visible wavelength band and in a near-infrared wavelength band so that photography is possible not only in daytime but also at night, and high image formation performance is strongly requested.

However, it is difficult for conventional lens systems to satisfy all of the aforementioned requests at the same time. As in the zoom lenses disclosed in Patent Documents 1 and 2, many conventional lens systems intend to remove chromatic aberrations in a visible wavelength band. Therefore, when the zoom lenses are applied to a wide wavelength range including a visible wavelength band through a near-infrared wavelength band, a problem of large chromatic aberrations arises.

In view of the foregoing circumstances, it is an object of the present invention to provide a variable magnification optical system that has a small F-number and high optical performance in which chromatic aberrations are excellently corrected in a wide wavelength range including a visible wavelength band through a near-infrared wavelength band, and which is small and low cost. Further, it is another object of the invention to provide an imaging apparatus including the variable magnification optical system.

A variable magnification optical system of the present invention is a variable magnification optical system comprising:

a first lens group having positive refractive power;
a second lens group having negative refractive power;
a stop;
a third lens group having positive refractive power; and
a fourth lens group having positive refractive power, which are in this order from an object side, wherein the first lens group, the stop and the third lens group are fixed relative to an image plane, but the second lens group and the fourth lens group move in an optical axis direction during magnification change, and wherein the fourth lens group has a focusing function, and wherein the third lens group includes at least an aspherical surface, and consists of, in the following order from the object side, a positive lens and a cemented lens of a positive lens and a double-concave lens cemented together, and wherein the following formulas (1) through (4) are satisfied:

$$3.5 < f3/fw < 6 \quad (1);$$

$$0.4 < f31p/f3 < 1.2 \quad (2);$$

$$-0.8 < f3/f3C < 0.1 \quad (3); \text{ and}$$

$$45 < \nu3Cn < \nu3Cp \quad (4), \text{ where}$$

f3: a focal length of the third lens group,
fw: a focal length of the entire system at a wide-angle end,
f31p: a focal length of the positive lens on the most object side in the third lens group,
f3C: a focal length of the cemented lens in the third lens group,
ν3Cn: an Abbe number of the double-concave lens constituting the cemented lens in the third lens group for d-line, and
ν3Cp: an Abbe number of the positive lens constituting the cemented lens in the third lens group for d-line.

In the variable magnification optical system of the present invention, it is desirable that the absolute value of the curvature radius of an image-side surface of the double-concave lens in the third lens group is greater than the absolute value of the curvature radius of an object-side surface of the double-concave lens.

In the variable magnification optical system of the present invention, it is desirable that the second lens group consists of a negative lens, a positive meniscus lens having a concave object-side surface, a double-concave lens and a positive lens, which are in this order from the object side, and that the following formulas (5) through (7) are satisfied:

$$1.0 < |f2|/fw < 1.4 \quad (5);$$

$$20 < \nu2p < 60 \quad (6); \text{ and}$$

$$2.8 < dz2/fw < 3.5 \quad (7), \text{ where}$$

f2: a focal length of the second lens group,
ν2p: an Abbe number of the positive meniscus lens in the second lens group for d-line, and dz2: the movement amount of the second lens group in the optical axis direction when magnification is changed from a wide-angle end to a telephoto end.

The sign of the value of dz2 is positive when the movement is toward the image side.

In the variable magnification optical system of the present invention, it is desirable that the first lens group consists of a negative lens having a concave image-side surface and three positive lenses having concave image-side surfaces in this order from the object side, and that the following formulas (8) through (10) are satisfied:

$$1.0 < |f1n|/f1 < 2.6 \quad (8);$$

$$1.7 < N1n < 2.0 \quad (9); \text{ and}$$

$$33 < v1n < 43 \quad (10), \text{ where}$$

f1n: a focal length of the negative lens in the first lens group,
f1: a focal length of the first lens group,
N1n: a refractive index of the negative lens in the first lens group for d-line, and
v1n: an Abbe number of the negative lens in the first lens group for d-line.

In the variable magnification optical system of the present invention, it is desirable that the fourth lens group consists of a double-convex lens, a negative meniscus lens having a concave image-side surface and a positive lens in this order from the object side, and that the following formulas (11) and (12) are satisfied:

$$0.8 < f4pF/f4pR < 2.0 \quad (11); \text{ and}$$

$$-1.3 < f4n/f4 < -0.6 \quad (12), \text{ where}$$

f4pF: a focal length of the double-convex lens in the fourth lens group,
f4pR: a focal length of the positive lens on the most image side in the fourth lens group,
f4n: a focal length of the negative meniscus lens in the fourth lens group, and
f4: a focal length of the fourth lens group.

In the variable magnification optical system of the present invention, when a lens includes an aspherical surface, the shape of a surface of the lens and the sign of the refractive power of the lens is considered in a paraxial region.

In the variable magnification optical system of the present invention, the number of lenses is the number of composition element lenses. For example, when the system includes a cemented lens composed of plural single lenses that are made of different materials from each other, and which are cemented together, the number of the single lenses constituting the cemented lens is counted.

An imaging apparatus of the present invention includes the aforementioned variable magnification optical system of the present invention.

A variable magnification optical system of the present invention includes a positive first lens group, a negative second lens group, a stop, a positive third lens group, and a positive fourth lens group, which are in this order from an object side. In the variable magnification optical system, the first lens group, the stop and the third lens group are fixed relative to an image plane during magnification change, and second lens group and fourth lens group move in an optical axis direction during magnification change, and fourth lens group has a focusing function. In the variable magnification optical system, the composition of lenses in the third lens group is set appropriately, and formulas (1) through (4) are satisfied at the same time. Therefore, it is possible to achieve a small F-number, excellent correction of chromatic aberrations in a wide wavelength range including a visible wavelength band through a near-infrared wavelength range and high optical performance while the optical system is small and low cost.

The imaging apparatus of the present invention includes the variable magnification optical system of the present invention. Therefore, the imaging apparatus is small, and structurable at low cost. Further, photography in low illumination conditions is possible. The imaging apparatus can cope with a wide wavelength range including a visible wavelength band through a near-infrared wavelength band, and obtain excellent images.

BRIEF DESCRIPTION OF THE DRAWINGS

FIG. 1A is a cross section illustrating the lens structure of a variable magnification optical system according to an embodiment of the present invention at a wide-angle end;

FIG. 1B is a cross section illustrating the lens structure of a variable magnification optical system according to an embodiment of the present invention at a telephoto end;

FIG. 2, Sections A through C are cross sections illustrating the lens structure of a variable magnification optical system in Example 1 of the present invention at a wide-angle end, in a middle focal length state, and at a telephoto end, respectively;

FIG. 3, Sections A through C are cross sections illustrating the lens structure of a variable magnification optical system in Example 2 of the present invention at a wide-angle end, in a middle focal length state, and at a telephoto end, respectively;

FIG. 4, Sections A through C are cross sections illustrating the lens structure of a variable magnification optical system in Example 3 of the present invention at a wide-angle end, in a middle focal length state, and at a telephoto end, respectively;

FIG. 5, Sections A through C are cross sections illustrating the lens structure of a variable magnification optical system in Example 4 of the present invention at a wide-angle end, in a middle focal length state, and at a telephoto end, respectively;

FIG. 6, Sections A through C are cross sections illustrating the lens structure of a variable magnification optical system in Example 5 of the present invention at a wide-angle end, in a middle focal length state, and at a telephoto end, respectively;

FIG. 7, Sections A through C are cross sections illustrating the lens structure of a variable magnification optical system in Example 6 of the present invention at a wide-angle end, in a middle focal length state, and at a telephoto end, respectively;

FIG. 8, Sections A through C are cross sections illustrating the lens structure of a variable magnification optical system in Example 7 of the present invention at a wide-angle end, in a middle focal length state, and at a telephoto end, respectively;

FIG. 9, Sections A through C are cross sections illustrating the lens structure of a variable magnification optical system in Example 8 of the present invention at a wide-angle end, in a middle focal length state, and at a telephoto end, respectively;

FIG. 10, Sections A through C are cross sections illustrating the lens structure of a variable magnification optical system in Example 9 of the present invention at a wide-angle end, in a middle focal length state, and at a telephoto end, respectively;

FIG. 11, Sections A through I are aberration diagrams of the variable magnification optical system in Example 1 of the present invention;

FIG. 12, Sections A through I are aberration diagrams of the variable magnification optical system in Example 2 of the present invention;

DESCRIPTION OF THE PREFERRED EMBODIMENTS

Figure 13:
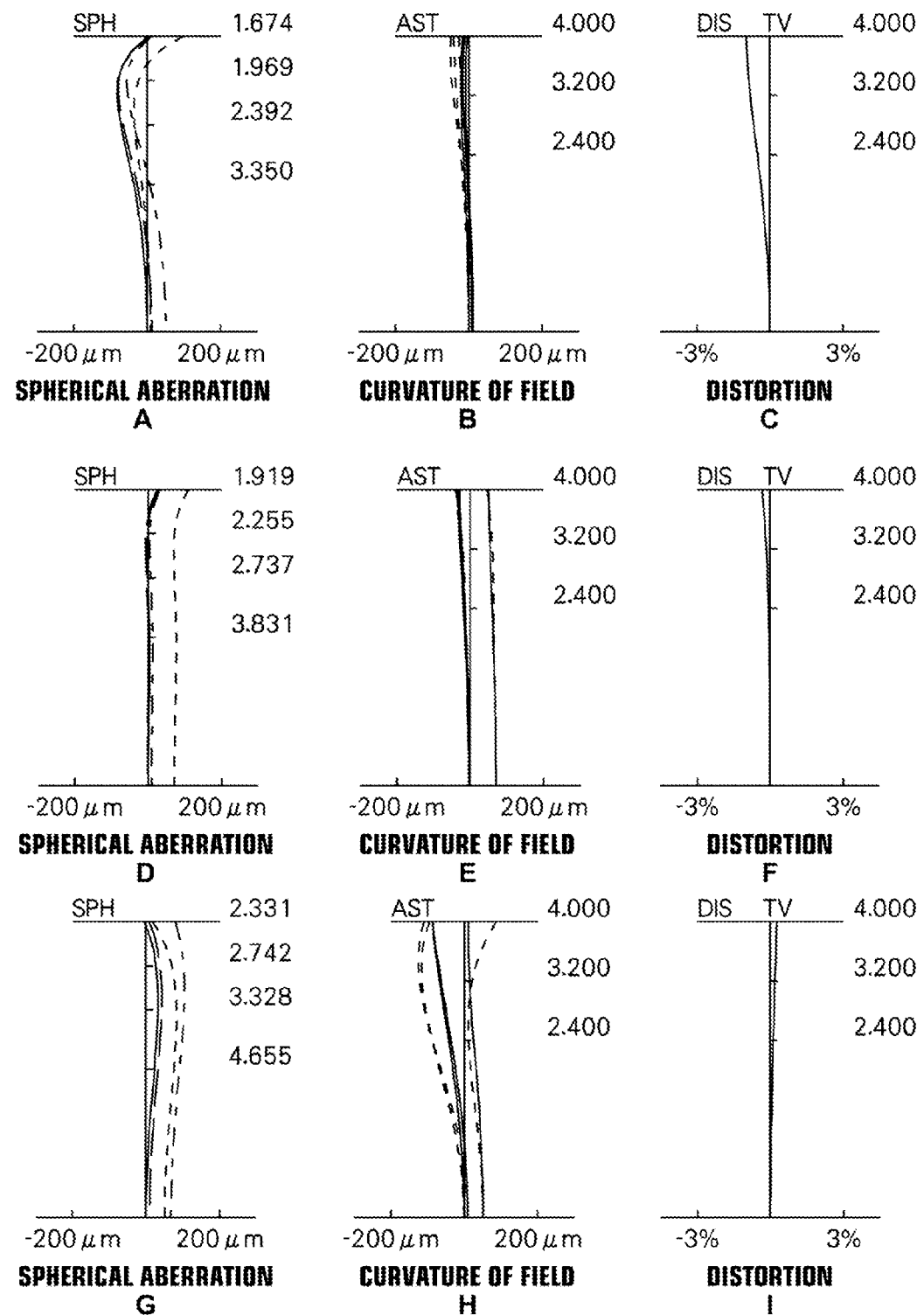
FIG. 13, Sections A through I are aberration diagrams of the variable magnification optical system in Example 3 of the present invention.

Hereinafter, embodiments of the present invention will be described with reference to drawings. FIGS. 1A and 1B are cross sections illustrating a structure example of a variable magnification optical system according to an embodiment of the present invention. FIGS. 1A and 1B illustrate the arrangement of lenses at a wide-angle end and at a telephoto end, respectively, when the optical system is focused on an object at infinity, and they correspond to a variable magnification optical system in Example 1, which will be described later. In FIGS. 1A and 1B, the left side is the object side, and the right side is the image side. In both of the cross sections in FIG. 1A and FIG. 1B, axial rays 2A, 2B and off-axial rays 3A, 3B at a maximum angle of view are also illustrated.

The variable magnification optical system includes, along optical axis Z, first lens group G1 having positive refractive power, second lens group G2 having negative refractive power, aperture stop St, third lens group G3 having positive refractive power, and fourth lens group G4 having positive refractive power, which are in this order from an object side. Aperture stop St illustrated in FIGS. 1A and 1B does not necessarily represent the size nor the shape of the aperture stop St, but the position of the aperture stop St on optical axis Z.

When the variable magnification optical system is applied to an imaging apparatus, it is desirable to arrange a cover glass, a prism, and various filters, such as an infrared ray cut filter and a low-pass filter, between the optical system and image plane Sim based on the structure of the camera side on which the lens is mounted. Therefore, FIGS. 1A and 1B illustrate an example in which parallel-flat-plate-shaped optical member PP, which is assumed to be such elements, is arranged between fourth lens group G4 and image plane Sim.

In the variable magnification optical system, first lens group G1, aperture stop St and third lens group G3 are fixed relative to image plane Sim during magnification change. Second lens group G2 and fourth lens group G4 move in an optical axis direction during magnification change. The variable magnification optical system is structured in such a manner that second lens group G2 has a variable magnification function, and fourth lens group G4 has a focusing function when a distance to an object fluctuates or when magnification is changed.

The four-group structure of the variable magnification optical system according to an embodiment of the present invention has many advantages, as a zoom lens or a varifocal lens having a variable magnification ratio in the order of ten times, such as the simpleness of barrel-variable magnification mechanisms and the easiness of handling.

It is an object of the variable magnification optical system according to an embodiment of the present invention to achieve a small F-number and high optical performance while the optical system is small and low cost. In particular, it is an object of the variable magnification optical system to excellently correct chromatic aberrations in a wide wavelength range including a visible wavelength band through a near-infrared wavelength band in the entire variable magnification range from a wide-angle end to a telephoto end.

It is necessary to keep a longitudinal chromatic aberration small in a wavelength range from a visible wavelength band through a near-infrared wavelength band to correct chromatic aberrations, as described above. For that purpose, it is necessary to optimize the lens structure of third lens group G3 because of the following reasons. The height of axial rays in third lens G3 on a wide-angle side is the highest in the entire system. Further, since aperture stop St is arranged immediately on the object side of the third lens group, the height of a principal ray of off-axial rays is low. Therefore, an influence of various off-axial aberrations on the third lens group is small, and the third lens group can easily correct a longitudinal chromatic aberration.

In particular, third lens group G3 can minimize a longitudinal chromatic aberration in a near-infrared wavelength band and a visible wavelength band especially on a wide-angle side by achromatization. Here, achromatization in the near-infrared wavelength band uses, based on a distribution of partial dispersion ratio for the near-infrared wavelength band, a material having a large Abbe number for a negative lens and a material having an Abbe number larger than the large Abbe number for a positive lens, and the negative lens and the positive lens are cemented together.

In contrast, on a telephoto side, the height of axial rays in first lens group G1 is the highest. Therefore, an influence of first lens group G1 on a longitudinal chromatic aberration is strong. Hence, optimization of the structure of first lens Group G1 is advantageous to correction of chromatic aberrations on a telephoto side. It is desirable to use an anomalous dispersion material in first lens group G1 to suppress generation of a longitudinal chromatic aberration.

In correction of chromatic aberrations, as a difference between the Abbe number of a material for a positive lens and the Abbe number of a material for a negative lens is greater, both of the refractive power of the positive lens and the refractive power of the negative lens become weaker. This is effective to keep a spherical aberration small, and to achieve a small F-number. Therefore, selection of material is important to keep both of a spherical aberration and chromatic aberrations in excellent conditions. Since both of the cost of an anomalous dispersion material and the process cost of the anomalous dispersion material are high, it is desirable that the outer diameter and the center thickness are as small as possible.

For example, when the movement amount of second lens group G2 from a wide-angle end to a telephoto end is reduced by increasing the negative refractive power of second lens group G2, the height of off-axial rays in first lens group G1 on a wide-angle side becomes low. Therefore, it is possible to make the lens diameter small, and that can suppress the cost. Therefore, allocation of refractive power to second lens group G2 is also an important element. In a variable magnification optical system having a large magnification ratio in the order of ten times, it is desirable to pay attention to the structure of second lens group 2, which is in charge of variable magnification, to limit a fluctuation of various aberrations, such as chromatic aberrations and a spherical aberration, at a middle magnification ratio to a small amount.

Therefore, the variable magnification optical system according to an embodiment of the present invention is structured in the following manner. First, third lens group G3, which is the most important lens group for correction of chromatic aberrations, includes at least one aspherical surface. As illustrated in FIG. 1A, third lens group G3 consists of, in the following order from the object side, lens L31 that is a positive lens and a cemented lens composed of lens L32 that is a positive lens and lens L33 that is a double-concave lens, which are cemented together.

Further, third lens group G3 satisfies the following formulas (1) through (4):

$$3.5 < f3/fw < 6 \qquad (1);$$

$$0.4 < f31p/f3 < 1.2 \qquad (2);$$

$$-0.8 < f3/f3C < 0.1 \qquad (3); \text{ and}$$

$$45 < v3Cn < v3Cp \qquad (4), \text{ where}$$

f3: a focal length of third lens group G3,
fw: a focal length of the entire system at a wide-angle end,
f31p: a focal length of lens L31 that is the positive lens on the most object side in third lens group G3,
f3C: a focal length of the cemented lens in third lens group G3,
v3Cn: an Abbe number of lens L33 that is the double-concave lens constituting the cemented lens in third lens group for d-line, and
v3Cp: an Abbe number of lens L32 that is the positive lens constituting the cemented lens in third lens group G3 for d-line.

When a distribution of partial dispersion ratio for a near-infrared wavelength band is considered, a combination of materials of lenses L32, L33 constituting the cemented lens in third lens group G3 is effective for achromatization in the near-infrared wavelength band. A material having an Abbe number greater than 45 is used for the negative lens, and a material having an Abbe number greater than that of the negative lens, and in which a difference in a partial dispersion ratio for the near-infrared wavelength band from the negative lens is extremely small, is used for the positive lens. Accordingly, it is possible to minimize a longitudinal chromatic aberration both for a near-infrared wavelength band and for a visible wavelength band especially on a wide-angle side.

At this time, if a difference in the Abbe numbers of the positive lens and the negative lens that are used in combination is small, the refractive power of each of the positive lens and the negative lens becomes strong, and especially, generation of a spherical aberration increases. Therefore, the positive lens and the negative lens that are used in combination are cemented together to reduce a surface in contact with air. Accordingly, generation of a spherical aberration is suppressed.

Further, it is desirable that the cemented surface of the cemented lens in third lens group 3 has a large curvature. If a difference in the refractive indices of the positive lens and the negative lens constituting the cemented lens is small, the refractive power of surface at the cemented surface is weak, and the amount of various aberrations other than chromatic aberrations generated at the cemented surface having the large curvature is small. Therefore, it is effective to correct chromatic aberrations at the cemented surface. In contrast, if the curvature of the cemented surface is restricted to a small value, the refractive power of each of the positive lens and the negative lens must be appropriately maintained; otherwise, correction of chromatic aberrations becomes insufficient. If the refractive power of each of the positive lens and the negative lens is supplemented at surfaces other than the cemented surface, it is necessary to increase the curvature of a surface in contact with air, at which various aberrations tend to be generated. Therefore, a spherical aberration and curvature of field become large, and it is impossible to maintain excellent image formation performance. Therefore, it is desirable that the absolute value of the curvature radius of the image-side surface of lens L33 is greater than the absolute value of the curvature radius of the object-side surface of lens L33.

Further, slight dispersion characteristics are given to the cemented lens by setting the combined focal length of the cemented lens in a range of from the vicinity of 0 to a slightly minus value. Further, positive lens L31 is arranged on the object side of the cemented lens to maintain the positive refractive power of third lens group G3. Further, it is possible to further reduce a spherical aberration by using an aspherical surface in third lens group G3. In this case, it is desirable to select lens L31, which is a single lens, as a lens having an aspherical surface in view of production.

Formula (1) defines allocation of refractive power to third lens group G3 in the entire system. When the value is lower than the lower limit of the formula (1), it is necessary to make the refractive power of first lens group G1 and second lens group G2 strong. That is effective to reduce the size of the entire lens system, but a fluctuation of aberrations during magnification change becomes too large, and it becomes impossible to maintain excellent image formation performance in the entire variable magnification range. When the value exceeds the upper limit of the formula (1), image formation performance becomes better, but a movement amount of second lens group G2 during magnification change becomes large, and the size of the entire lens system becomes large, and that is not desirable.

Formula (2) is related to allocation of refractive power to positive lens L31 on the most object side in third lens group G3 with respect to third lens group G3. The formula (2) should be satisfied to maintain both of a spherical aberration and a longitudinal chromatic in excellent conditions.

When the value is lower than the lower limit of the formula (2), the positive refractive power of positive lens L31 becomes too strong. Further, the negative refractive power of the cemented lens in third lens group G3 becomes strong to balance. Therefore, third lens group G3 becomes a lens system having a small telephoto ratio, and the back focus of the entire system becomes too short. Further, the dispersion action of off-axial rays is promoted, and the flatness of curvature of field in the entire image formation region deteriorates.

When the value exceeds the upper limit of the formula (2), the positive refractive power of lens L31 becomes too weak, and the back focus of the entire system becomes too long. Further, the height of peripheral off-axial rays in fourth lens group G4 becomes high, and it becomes necessary to make the outer diameters of lenses in fourth lens group G4 large. That contradicts reduction in the size of the entire lens system.

Formula (3) is related to allocation of refractive power to the cemented lens in third lens group G3 with respect to third lens group G3. When the formula (3) is satisfied, it is possible to maintain both a spherical aberration and a longitudinal chromatic aberration in excellent conditions. When the value is lower than the lower limit of the formula (3), the negative refractive power of the cemented lens becomes too strong, and the telephoto ratio of third lens group G3 becomes small, and the dispersion action of off-axial rays is promoted, and the flatness of curvature of field in the entire image formation region deteriorates. When the value exceeds the upper limit of the formula (3), it is necessary to reduce the positive refractive power of lens L31. Therefore, problems similar to those of the case when the upper limit of the formula (2) is exceeded arise.

Formula (4) is related to the Abbe numbers of materials of the positive lens and the negative lens used in the cemented lens in third lens group G3. When the value is lower than the lower limit of the formula (4), the cemented lens in third lens group G3 is a combination of materials having a large difference in partial dispersion ratios for a near-infrared wavelength band, and a longitudinal chromatic aberration in a near-infrared wavelength band and a visible wavelength band becomes an unacceptable amount. Further, when the relationship between the values of v3Cn and v3Cp contradicts the formula (4), selection of the optical materials of the positive lens and the negative lens is not appropriate, and achromatization is not possible.

Therefore, it is more desirable that the following formula (4-1) is satisfied instead of the formula (4):

$$55 < v3Cn < v3Cp \qquad (4\text{-}1).$$

For example, as illustrated in FIG. 1A, it is desirable that second lens group G2 consists of lens L21 that is a negative lens, lens L22 that is a positive meniscus lens having a concave object-side surface, lens L23 that is a double-concave lens and lens L24 that is a positive lens, which are in this order from the object side. Further, it is desirable that the following formulas (5) through (7) are satisfied:

$$1.0 < |f2|/fw < 1.4 \qquad (5);$$

$$20 < v2p < 60 \qquad (6); \text{ and}$$

$$2.8 < dz2/fw < 3.5 \qquad (7), \text{ where}$$

f2: a focal length of second lens group G2, v2p: an Abbe number of lens L22 that is the positive meniscus lens in second lens group G2 for d-line, and dz2: the movement amount of second lens group G2 in the optical axis direction when magnification is changed from a wide-angle end to a telephoto end.

Second lens group G2, the refractive power of which becomes high to reduce size, consists of lenses L21 through L25 as described above. In such a case, it is possible to suppress fluctuations of a longitudinal chromatic aberration in a visible wavelength band through a near-infrared wavelength band, a lateral chromatic aberration of off-axial rays, a shift in a coma aberration for each wavelength and the like for the entire variable magnification range without increasing the size of the lens system.

Formula (5) limits the influence of the negative refractive power of second lens group G2 on the entire system. When the value is lower than the lower limit of the formula (5), the movement amount of second lens group G2 becomes small with respect to a predetermined variable magnification ratio. Therefore, it is possible to make the length of the entire lens system small. Further, it is possible to make the outer diameters of lenses in first lens group G1 small, and the like, and that is effective to reduce the size of the lens system. However, the positive refractive power of first lens group G1 and the positive refractive power of third lens group G3 increase, and a fluctuation of aberrations becomes too large. Therefore, it becomes impossible to maintain image formation performance in the entire variable magnification range evenly and excellently.

When the value exceeds the upper limit of the formula (5), the movement amount from a wide-angle end to a telephoto end becomes too long, and the length of the entire lens system becomes long, and the diameters of lenses in first lens group G1 become large, and that contradicts reduction in size. When second lens group G2 consists of negative lens L21, positive meniscus lens L22 having a concave object-side surface, double-concave lens L23 and positive lens L24, which are in this order from the object side, and formula (5) is satisfied, fluctuations of a spherical aberration, curvature of field, chromatic aberrations and the like are suppressed without losing the compactness of the system. Further, it is possible to maintain excellent image formation performance in an entire image formation region.

In second lens group G2, the height of off-axial rays 3A is higher than the height of axial rays 2A at a wide-angle end, and the off-axial rays are greatly away from an optical axis. In contrast, the height of axial rays 2B is higher than the height of a principal ray of off-axial rays 3B at a telephoto end.

To suppress a fluctuation of various aberrations caused by the difference in the heights of these rays, when negative lens L21 is arranged on the most object side in second lens group G2, positive lens L22 should be arranged immediately on the image side of the negative lens L21 to ease the dispersion characteristics of the lens L21. Meanwhile, it is impossible to make the negative refractive power of the whole second lens group G2 very strong, because the negative refractive power is restricted by formula (5). Therefore, it is necessary to keep the positive refractive power of lens L22 within an appropriate weak level so that the negative refractive power of lens L21, which most contributes to the negative refractive power of the whole second lens group G2, does not become stronger. Therefore, when the lens L22 is the positive meniscus lens having a concave object-side surface, it is possible to give appropriate positive refractive power together with strong converging characteristics to the lens L22.

When the lens L22 is set as described above, it is necessary to restrict the Abbe number of the material of the lens L22, as defined in formula (6). When the value is lower than the lower limit of the formula (6), a lateral chromatic aberration on a near-infrared wavelength band side increases on a wide-angle side, and a longitudinal chromatic aberration on a near-infrared wavelength band side increases on a telephoto side. When the value exceeds the upper limit of the formula (6), a lateral chromatic aberration on a short wavelength side increases on a wide-angle side, and a longitudinal chromatic aberration on a short wavelength side increases on a telephoto side. Even if the other lens elements in second lens group G2 are changed, a fluctuation of curvature of field and a coma aberration increases. Therefore, it is impossible to maintain excellent performance in the entire range.

Therefore, it is more desirable that the following formula (6-1) is satisfied instead of the formula (6):

$$20 < v2p < 45 \qquad (6\text{-}1).$$

Formula (7) is set to satisfy a demand for the compactness of the lens system. The formula (7) and the formula (5) compensate each other. When the value is lower than the lower limit of the formula (7), the lens system becomes short, and that is favorable for the compactness. However, the refractive power of each of first lens group G1 through third lens group G3 becomes too strong, and it is impossible to maintain excellent image formation performance in the entire region. When the value exceeds the upper limit of the formula (7), image formation performance is good, but the diameter becomes large, and the compactness is lost. Even if the lens system is mainly used for surveillance, the diameter of the lens barrel becomes large, and a large space is required, and that contradicts size reduction.

Here, it is desirable that lens L21 is a negative meniscus lens having a convex object-side surface. When the object-side surface of the lens L21 is convex, it is possible to minimize the amount of aberrations generated when rays output from first lens group G1 enter second lens group G2. Further, it is desirable that lens L23 and lens L24 are cemented together. In such a case, it is possible to arrange the cemented lens in the vicinity of aperture stop St, and that is advantageous to correction of a longitudinal chromatic aberration.

For example, as illustrated in FIG. 1A, it is desirable that first lens group G1 consists of lens L11 that is a negative lens having a concave image-side surface and lenses L12 through L14 that are three positive lenses having concave image-side surfaces in this order from the object side. Further, it is desirable that the following formulas (8) through (10) are satisfied:

$$1.0 < |f1n|/f1 < 2.6 \qquad (8);$$

$$1.7 < N1n < 2.0 \qquad (9); \text{ and}$$

$$33 < v1n < 43 \qquad (10), \text{ where}$$

f1n: a focal length of lens L11 that is the negative lens in first lens group G1,
f1: a focal length of first lens group G1,
N1n: a refractive index of lens L11 that is the negative lens in first lens group G1 for d-line, and
v1n: an Abbe number of lens L11 that is the negative lens in first lens group G1 for d-line.

When the aforementioned desirable structure is adopted in first lens group G1, it is possible to suppress generation of chromatic aberrations especially in a range from a middle variable magnification to a telephoto end.

Conventionally, a variable magnification lens system of a field related to the present invention has four-group structure, and the lens system consists of a first lens group having positive refractive power, a second lens group having negative refractive power, a stop, a third lens group having positive refractive power, and a fourth lens group having positive refractive power. Further, the first lens group consists of a negative lens, a positive lens and a positive meniscus lens in this order from the object side.

However, in the variable magnification optical system of the present embodiment, the combined refractive power of plural positive lenses included in first lens group G1 needs to be stronger than that of the conventional one because of the following reasons. Therefore, it is desirable that the number of positive lenses in first lens group G1 is three.

Like in third lens group G3, it is necessary that especially a longitudinal chromatic aberration is small in first lens group G1 to realize a variable magnification lens system for a wide wavelength range including a visible wavelength band through a near-infrared wavelength band.

The height of axial rays 2B of first lens group G1 is higher than that of third lens group G3 on a telephoto side. Therefore, an influence of first lens group G1 on a longitudinal chromatic aberration is stronger. To reduce a longitudinal chromatic aberration in a near-infrared wavelength band with respect to a visible wavelength band on a telephoto side, it is desirable to consider the lens structure and selection of material of first lens group G1 instead of relying only on optimization of the structure of third lens group G3.

Use of anomalous dispersion material in first lens group G1 can suppress generation a longitudinal chromatic aberration. Therefore, in first lens group G1, it becomes necessary to make the Abbe number of a negative lens larger than an ordinary value. Consequently, it becomes necessary to make the combined refractive power of plural positive lenses included in first lens group G1 stronger to satisfy the achromatization condition.

However, this increases the amount of a spherical aberration especially on a telephoto side. Therefore, the number of the positive lenses in first lens group G1 is three, and refractive power is distributed to the three lenses to make a spherical aberration small. Consequently, it is desirable that first lens group G1 consists of a negative lens and three positive lenses, which follows the negative lens.

Formula (8) defines a relationship between the negative refractive power of lens L11 that is a negative lens in first lens group G1 and the refractive power of first lens group G1. When the value is lower than the lower limit of the formula (8), the negative refractive power of lens L11 is strong, and the Abbe number of lens L11 becomes large for achromatization, and a longitudinal chromatic aberration improves. However, the positive refractive power of the three positive lenses in combination also becomes strong, and correction of a spherical aberration becomes insufficient especially on a telephoto side. It becomes necessary to make the refractive power of first lens group G1 weak to avoid this problem. The refractive power of second lens group G2 and third lens group G3 becomes weak to structure the variable magnification system in which first lens group G1 and third lens group G3 are fixed groups. Consequently, the movement amount of second lens group G2 becomes large, and the entire lens system becomes large. Therefore, both the compactness and the cost are not satisfied.

When the value exceeds the upper limit of the formula (8), the negative refractive power of lens L11 becomes weak. On the contrary to the case in which the value is lower than the lower limit of the formula (8), generation of a spherical aberration decreases further, and that is desirable. However, it is necessary to make the Abbe number of negative lens L11 small for achromatization. A longitudinal chromatic aberration on a telephoto side becomes large, and defocus occurs for a visible wavelength band and a near-infrared wavelength band, and performance in the near-infrared wavelength band deteriorates.

Formula (9) suppresses a spherical aberration that is generated mainly in first lens group G1. In first lens group G1, a spherical aberration is often generated especially at a telephoto end. Meanwhile, lens L11 is the only negative lens included in first lens group G1, and lens L11 must be cemented with Lens L12, which is a positive lens following the lens L11, to suppress the amount of aberrations generated at the lens L11. Therefore, a difference in refractive indices at the cementing surface is important.

Use of a material having a large Abbe number and anomalous dispersion characteristics in positive lens L12, which is cemented with lens L11, is prerequisite for achromatization conditions. Therefore, a material having a low refractive index of 1.5 or less is used in lens L12. Hence, it is desirable to utilize a difference in refractive indices between lens L11 and lens L12 by making the refractive index of lens L11 high, and to make the image side surface of lens L11 concave toward the image side. Such a shape of the image side surface of lens L11 is advantageous to correction of curvature of field at a wide-angle end. It is desirable to give as strong dispersion characteristics as possible to lens L11 so that lens L11 compensates a spherical aberration generated by the strong convergence in first lens group G1 having positive refractive power.

When the value is lower than the lower limit of the formula (9), the difference in the refractive indices becomes too small, and the dispersion characteristics of lens L11 becomes weak, and correction of a spherical aberration becomes insufficient. Consequently, image formation performance deteriorates. When the value exceeds the upper limit of the formula (9), a further improvement in performance can be expected, but such an optical material is not obtainable, or the cost of the material is extremely high. Therefore, such a material is not adoptable in real situations.

Therefore, it is more desirable that the following formula (9-1) is satisfied instead of the formula (9):

$$1.8 < N1n < 2.0 \qquad (9\text{-}1).$$

Formula (10) defines a condition for maintaining a good longitudinal chromatic aberration from a visible wavelength band through a near-infrared wavelength band, especially, on a telephoto side. When the value is lower than the lower limit of the formula (10), it becomes impossible to maintain a good longitudinal chromatic aberration from a visible wavelength band through a near-infrared wavelength on a telephoto side. When the value exceeds the upper limit of the formula (10), it is possible to maintain a good longitudinal chromatic aberration. However, the total refractive power of the three positive lenses in first lens group G1 becomes strong for achromatization, and a spherical aberration and a coma aberration on a telephoto side deteriorate.

For example, as illustrated in FIG. 1A, it is desirable that fourth lens group G4 consists of lens L41 that is a double-convex lens, lens L42 that is a negative meniscus lens having a concave image-side surface and positive lens L43 in this order from the object side. Further, it is desirable that the following formulas (11) and (12) are satisfied:

$$0.8 < f4pF/f4pR < 2.0 \qquad (11); \text{ and}$$

$$-1.3 < f4n/f4 < -0.6 \qquad (12), \text{ where}$$

f4pF: a focal length of lens L41 that is the double-convex lens in fourth lens group G4, f4pR: a focal length of lens L43 that is the positive lens on the most image side in fourth lens group G4, f4n: a focal length of lens L42 that is the negative meniscus lens in fourth lens group G4, and f4: a focal length of fourth lens group G4.

The aforementioned desirable structure of fourth lens group G4 is related to the detailed structure of fourth lens group G4 and allocation of refractive power. When the refractive power in fourth lens group G4 is arranged in such a manner that a positive lens, a negative lens and a positive lens are arranged in this order from the object side, a coma aberration is small while small F-numbers of, for example, F1.6 on a wide-angle side and F2.3 on a telephoto side are secured. Further, it is possible to obtain high-performance image qualities in the entire image formation region.

Formula (11) defines the ratio of the refractive power of positive lens L41 on the most object side in fourth lens group G4 to the refractive power of positive lens L43 on the most image side in fourth lens group G4. The formula should be satisfied to maintain a good balance between a spherical aberration and off-axial aberrations, such as curvature of field and distortion.

When the value is lower than the lower limit of the formula (11), the positive refractive power of lens L41 becomes strong, and a back focus of the entire system becomes shorter. Further, correction of a spherical aberration becomes insufficient, and that is not desirable. Even if the spherical aberration is tried to be corrected by bending an object-side surface and an image-side surface of the following negative lens L42, curvature of field and a coma aberration deteriorate because excessive dispersion characteristics are given to off-axial rays.

When the value exceeds the upper limit of the formula (11), the positive refractive power of lens L41 becomes weak, and the amount of a generated spherical aberration decreases, and that is desirable. However, the ratio of the positive refractive power of lens L43 becomes large, and negative curvature of field increases. When the value is within the range defined by the formula (11), a good balance between the amount of a spherical aberration and curvature of field or a coma aberration is maintained. Further, it is possible to maintain excellent image formation performance in the entire image formation region.

Formula (12) is related to allocation of refractive power to negative lens L42 with respect to the refractive power of fourth lens group G4. When the value is lower than the lower limit of the formula (12), the negative refractive power in fourth lens group G4 becomes weak, and correction of a spherical aberration becomes insufficient, or correction of curvature of field becomes insufficient. Therefore, excellent image formation performance is not obtainable. When the value exceeds the upper limit of the formula (12), the negative refractive power in fourth lens group G4 becomes too strong, and a spherical aberration is excessively corrected, and that is not desirable. When the value is within the range defined by the formula (12), it is possible to maintain excellent image formation performance in the entire image formation region.

When the variable magnification optical system of the present embodiment is used in tough conditions, it is desirable that a multi-layer coating for protection is applied. Besides the coating for protection, an anti-reflection coating for reducing ghost light or the like during usage may be applied.

In the example illustrated in FIG. 1A and FIG. 1B, optical member PP is arranged between the lens system and image plane Sim. Instead of arranging various filters, such as a low-pass filter and a filter that cuts a specific wavelength band, or the like, the various filters may be arranged between lenses. Alternatively, a coating having similar action to that of various filters may be applied to a lens surface of one of the lenses.

Next, numerical value examples of the variable magnification optical system of the present invention will be described. FIG. 2, Sections A, B and C illustrate arrangement of lenses of the variable magnification optical system in Example 1 at a wide-angle end, in a middle focal length state, a telephoto end, respectively. In FIG. 2, Sections A through C, optical member PP is also illustrated, and the left side is the object side, and the right side is the image side. The illustrated aperture stop St does not necessarily represent the size nor the shape of the aperture stop St, but represents the position of the aperture stop St on optical axis Z. Further, arrows between FIG. 2, Section A and FIG. 2, Section B and arrows between FIG. 2, Section B and FIG. 2, Section C schematically indicate movement paths of second lens group G2 and fourth lens group G4 that move as magnification is changed.

Similarly, FIG. 3, Sections A through C, FIG. 4, Sections A through C, FIG. 5, Sections A through C, FIG. 6, Sections A through C, FIG. 7, Sections A through C, FIG. 8, Sections A through C, FIG. 9, Sections A through C and FIG. 10, Sections A through C illustrate arrangement of lenses of the variable magnification optical systems at a wide-angle end, in a middle focal length state, a telephoto end in Examples 2 through 9, respectively. The variable magnification optical systems in Examples 1 through 10 are structured as varifocal lenses.

The upper section of Table 1 shows basic lens data on a variable magnification optical system in Example 1, and the lower section of Table 1 shows data on variable magnification. Table 2 shows aspheric coefficients. Similarly, Table 3 through Table 18 show data on the variable magnification optical systems in Examples 2 through 9. Next, the meanings of signs in the tables will be described, using the tables of Example 1 as an example. The meaning of the signs in the tables of Examples 2 through 9 are basically similar.

In the basic lens data in the upper section of Table 1, the column of Si shows the surface numbers of i-th (i=1, 2, 3, . . . ) surfaces. The surface number of the most object-side surface of elements is the first surface, and the surface numbers sequentially increase toward the image side. The column of Ri shows the curvature radius of the i-th surface. The column of Di shows a distance, on optical axis Z, between the i-th surface and the (i+1)th surface. The column of Ndi shows the refractive index of a medium between the i-th surface and the (i+1)th surface for d-line (wavelength is 587.6 nm), and the column of vdj shows the Abbe number of the j-th (j=1, 2, 3, . . . ) optical element for d-line when the most object-side optical element is the first optical element, and the value of j sequentially increases toward the image side.

The sign of a curvature radius is positive when the shape of a surface is convex toward the object side, and negative when the shape of a surface is convex toward the image side. The basic lens data include aperture stop St and optical member PP. The sign "∞ (APERTURE STOP)" is written for a surface corresponding to aperture stop St in the column of Ri. Further, the sign "∞(IMAGE PLANE)" is written for a surface corresponding to an image plane in the column of Ri.

In the basic lens data of Table 1, "VARIABLE 1", "VARIABLE 2", "VARIABLE 3" and "VARIABLE 4" are written in the rows of surface distances that change when magnification is changed. Variable 1 is a distance between first lens group G1 and second lens group G2, and variable 2 is a distance between second lens group G2 and aperture stop St, and variable 3 is a distance between third lens group G3 and fourth lens group G4, and variable 4 is a distance between fourth lens group G4 and optical member PP.

The data on variable magnification in the lower section of Table 1 show variable 1, variable 2, variable 3, variable 4, the focal length of the entire system, back focus Bf, F-number (Fno.), full angle of view 2ω at a wide-angle end, in a middle focal length state and at a telephoto end. In the basic lens data and the data on variable magnification, degree is used as the unit of angle, and mm is used as the unit of length. However, since an optical system can be used by proportionally enlarging or reducing the optical system, other appropriate units may be used.

In the basic lens data of Table 1, mark * is attached to the surface number of an aspherical surface. Table 1 shows, as the curvature radius of the aspherical surface, the numerical value of a paraxial curvature radius. Table 2 shows aspheric coefficients about the aspherical surfaces. In the numerical values of Table 2, "E-n" (n: integer) means "×10$^{-n}$". The aspheric coefficients are values of coefficients κ, Am (m=4, 6, 8, 10) in an aspherical equation represented by the following equation (A). Here, Σ in equation (A) represents a sum about the term of m (m=4, 6, 8, 10).

$$Zd = C \cdot h^2 / \{1 + (1 - \kappa \cdot C^2 \cdot h^2)^{1/2}\} + \Sigma Am^* h^m \quad (A),\text{ where}$$

Zd: depth of aspherical surface (the length of a perpendicular from a point on the aspherical surface at height h to a flat plane that contacts with the vertex of the aspherical surface and is perpendicular to the optical axis), h: height (the length from the optical axis to the lens surface), C: paraxial curvature, and κ, Am: aspheric coefficients (m=4, 6, 8, 10).

TABLE 1

EXAMPLE 1

| Si | Ri | Di | Ndi | vdj |
|---|---|---|---|---|
| 1 | 65.706 | 1.400 | 1.83400 | 37.2 |
| 2 | 30.827 | 6.702 | 1.49700 | 81.6 |
| 3 | 378.473 | 0.100 | 1.00000 | |
| 4 | 32.918 | 5.284 | 1.49700 | 81.6 |
| 5 | 180.373 | 0.100 | 1.00000 | |
| 6 | 37.438 | 3.806 | 1.49700 | 81.6 |
| 7 | 127.634 | VARIABLE 1 | 1.00000 | |
| 8 | 88.021 | 0.760 | 1.83480 | 42.7 |
| 9 | 9.726 | 4.678 | 1.00000 | |
| 10 | −23.690 | 1.880 | 1.84666 | 23.8 |
| 11 | −14.848 | 1.172 | 1.00000 | |
| 12 | −12.677 | 0.750 | 1.58144 | 40.7 |
| 13 | 11.556 | 2.570 | 1.84666 | 23.8 |
| 14 | 48.874 | VARIABLE 2 | 1.00000 | |
| 15 | ∞(APERTURE STOP) | 1.668 | 1.00000 | |
| 16* | 50.605 | 4.359 | 1.56866 | 58.6 |
| 17* | −38.029 | 0.457 | 1.00000 | |
| 18 | 23.256 | 6.910 | 1.49700 | 81.6 |
| 19 | −10.290 | 0.700 | 1.51633 | 64.1 |
| 20 | 20.708 | VARIABLE 3 | 1.00000 | |
| 21* | 15.658 | 4.700 | 1.49700 | 81.6 |
| 22* | −28.605 | 0.929 | 1.00000 | |
| 23 | 40.635 | 0.700 | 1.78472 | 25.7 |
| 24 | 11.139 | 2.502 | 1.00000 | |
| 25 | 13.177 | 3.000 | 1.65160 | 58.5 |
| 26 | 5414.200 | VARIABLE 4 | 1.00000 | |
| 27 | ∞ | 1.500 | 1.51633 | 64.1 |
| 28 | ∞ | 6.704 | 1.00000 | |
| 29 | ∞(IMAGE PLANE) | | | |

| | WIDE-ANGLE END | MIDDLE | TELEPHOTO END |
|---|---|---|---|
| VARIABLE 1 | 0.595 | 16.284 | 25.773 |
| VARIABLE 2 | 26.369 | 10.680 | 1.191 |
| VARIABLE 3 | 9.424 | 5.739 | 11.732 |
| VARIABLE 4 | 10.000 | 14.880 | 8.888 |
| FOCAL LENGTH | 8.079 | 25.045 | 76.993 |
| Bf | 1.900 | 1.900 | 1.900 |
| Fno. | 1.68 | 1.89 | 2.30 |
| 2ω | 54.56 | 18.29 | 5.90 |

TABLE 2

EXAMPLE 1

| SURFACE | κ | A4 | A6 | A8 | A10 |
|---|---|---|---|---|---|
| 16* | 9.93750E−01 | −5.29299E−06 | −2.13764E−09 | 9.70182E−12 | 5.93140E−15 |
| 17* | 1.00000E+00 | 7.41602E−06 | −8.19023E−09 | −1.37540E−11 | −7.56296E−15 |
| 21* | 7.57777E−01 | −2.26517E−05 | −2.64809E−08 | 5.67800E−12 | 3.75813E−15 |
| 22* | 1.00000E+00 | 1.25432E−05 | 1.43916E−08 | −6.27340E−12 | −3.36151E−15 |

TABLE 3

EXAMPLE 2

| Si | Ri | Di | Ndi | vdj |
|---|---|---|---|---|
| 1 | 63.030 | 1.400 | 1.83400 | 37.2 |
| 2 | 30.202 | 7.700 | 1.49700 | 81.6 |
| 3 | 1633.960 | 0.100 | 1.00000 | |
| 4 | 30.677 | 5.700 | 1.49700 | 81.6 |
| 5 | 197.860 | 0.100 | 1.00000 | |
| 6 | 47.267 | 3.000 | 1.49700 | 81.6 |
| 7 | 126.749 | VARIABLE 1 | 1.00000 | |
| 8 | 231.606 | 0.760 | 1.83480 | 42.7 |
| 9 | 11.893 | 3.650 | 1.00000 | |
| 10 | −22.403 | 1.880 | 1.69680 | 55.5 |
| 11 | −14.543 | 0.837 | 1.00000 | |
| 12 | −12.390 | 0.750 | 1.73400 | 51.5 |
| 13 | 13.133 | 2.570 | 1.84665 | 23.8 |
| 14 | −886.347 | VARIABLE 2 | 1.00000 | |
| 15 | ∞(APERTURE STOP) | 1.660 | 1.00000 | |
| 16* | 25.752 | 5.000 | 1.56864 | 58.6 |
| 17* | −25.604 | 0.970 | 1.00000 | |
| 18 | −56.537 | 4.000 | 1.49700 | 81.6 |
| 19 | −9.848 | 0.700 | 1.51823 | 59.0 |
| 20 | 86.155 | VARIABLE 3 | 1.00000 | |
| 21 | 20.166 | 4.700 | 1.49700 | 81.6 |
| 22 | −44.093 | 0.100 | 1.00000 | |
| 23 | 28.564 | 0.700 | 1.76182 | 26.5 |
| 24 | 10.443 | 1.500 | 1.00000 | |
| 25 | 12.113 | 3.000 | 1.62041 | 60.3 |
| 26 | −4771.200 | VARIABLE 4 | 1.00000 | |
| 27 | ∞ | 1.500 | 1.51633 | 64.1 |
| 28 | ∞ | 5.728 | 1.00000 | |
| 29 | ∞(IMAGE PLANE) | | | |

| | WIDE-ANGLE END | MIDDLE | TELEPHOTO END |
|---|---|---|---|
| VARIABLE 1 | 0.817 | 16.063 | 25.892 |
| VARIABLE 2 | 26.248 | 11.002 | 1.173 |
| VARIABLE 3 | 9.240 | 4.657 | 9.976 |
| VARIABLE 4 | 10.000 | 14.583 | 9.264 |
| FOCAL LENGTH | 8.158 | 25.291 | 77.748 |
| Bf | 5.728 | 5.728 | 5.728 |
| Fno. | 1.68 | 1.96 | 2.27 |
| 2ω | 56.47 | 18.21 | 5.82 |

TABLE 5

EXAMPLE 3

| Si | Ri | Di | Ndi | vdj |
|---|---|---|---|---|
| 1 | 66.873 | 1.400 | 1.83400 | 37.2 |
| 2 | 31.049 | 6.700 | 1.49700 | 81.6 |
| 3 | 340.314 | 0.100 | 1.00000 | |
| 4 | 33.340 | 5.284 | 1.49700 | 81.6 |
| 5 | 187.333 | 0.100 | 1.00000 | |
| 6 | 36.065 | 3.806 | 1.49700 | 81.6 |
| 7 | 124.087 | VARIABLE 1 | 1.00000 | |
| 8 | 94.410 | 0.760 | 1.83480 | 42.7 |
| 9 | 9.718 | 4.678 | 1.00000 | |
| 10 | −24.109 | 1.880 | 1.84665 | 23.8 |
| 11 | −14.600 | 1.172 | 1.00000 | |
| 12 | −12.787 | 0.750 | 1.58144 | 40.7 |
| 13 | 11.475 | 2.570 | 1.84665 | 23.8 |
| 14 | 46.226 | VARIABLE 2 | 1.00000 | |
| 15 | ∞(APERTURE STOP) | 1.668 | 1.00000 | |
| 16* | 45.851 | 4.359 | 1.56865 | 58.6 |
| 17* | −30.353 | 0.326 | 1.00000 | |
| 18 | 30.989 | 5.342 | 1.49700 | 81.6 |
| 19 | −11.041 | 0.700 | 1.58913 | 61.2 |
| 20 | 36.315 | VARIABLE 3 | 1.00000 | |
| 21 | 18.629 | 4.700 | 1.49700 | 81.6 |
| 22 | −42.734 | 0.597 | 1.00000 | |
| 23 | 30.996 | 0.700 | 1.78472 | 25.7 |
| 24 | 10.686 | 2.501 | 1.00000 | |
| 25 | 13.538 | 3.000 | 1.65160 | 58.5 |
| 26 | −90.643 | VARIABLE 4 | 1.00000 | |
| 27 | ∞ | 1.500 | 1.51633 | 64.1 |
| 28 | ∞ | 6.704 | 1.00000 | |
| 29 | ∞(IMAGE PLANE) | | | |

| | WIDE-ANGLE END | MIDDLE | TELEPHOTO END |
|---|---|---|---|
| VARIABLE 1 | 0.779 | 16.500 | 25.878 |
| VARIABLE 2 | 26.185 | 10.464 | 1.086 |
| VARIABLE 3 | 9.863 | 6.269 | 12.522 |
| VARIABLE 4 | 10.000 | 13.594 | 7.341 |
| FOCAL LENGTH | 8.171 | 25.330 | 77.868 |
| Bf | 4.930 | 4.930 | 4.930 |
| Fno. | 1.68 | 1.92 | 2.33 |
| 2ω | 53.81 | 18.10 | 5.83 |

TABLE 4

EXAMPLE 2

| SURFACE | κ | A4 | A6 | A8 | A10 |
|---|---|---|---|---|---|
| 16* | 3.05786E+00 | −3.85399E−05 | −3.19579E−07 | −1.16563E−09 | −6.93699E−13 |
| 17* | 3.63967E+00 | 3.38745E−05 | −2.16423E−07 | −7.77555E−10 | −2.70282E−13 |

TABLE 6

EXAMPLE 3

| SURFACE | κ | A4 | A6 | A8 | A10 |
|---|---|---|---|---|---|
| 16* | 9.97022E−01 | −1.14180E−06 | 3.17651E−08 | 2.63570E−11 | 1.17200E−14 |
| 17* | 1.00000E+00 | 6.08280E−06 | −4.87744E−08 | −3.30268E−11 | −1.43903E−14 |

TABLE 7

EXAMPLE 4

| Si | Ri | Di | Ndi | νdj |
|---|---|---|---|---|
| 1 | 63.884 | 1.400 | 1.80440 | 39.6 |
| 2 | 28.861 | 6.702 | 1.48563 | 85.2 |
| 3 | 324.210 | 0.100 | 1.00000 | |
| 4 | 31.404 | 5.284 | 1.48563 | 85.2 |
| 5 | −716.987 | 0.100 | 1.00000 | |
| 6 | 33.655 | 2.680 | 1.59240 | 68.3 |
| 7 | 47.788 | VARIABLE 1 | 1.00000 | |
| 8 | 58.093 | 0.760 | 1.83945 | 55.5 |
| 9 | 10.065 | 4.678 | 1.00000 | |
| 10 | −21.192 | 1.880 | 1.84666 | 23.8 |
| 11 | −14.173 | 0.834 | 1.00000 | |
| 12 | −11.732 | 0.750 | 1.58144 | 40.7 |
| 13 | 12.551 | 2.570 | 1.84666 | 23.8 |
| 14 | 58.663 | VARIABLE 2 | 1.00000 | |
| 15 | ∞(APERTURE STOP) | 1.668 | 1.00000 | |
| 16* | 61.746 | 4.359 | 1.56864 | 58.6 |
| 17* | −31.067 | 0.200 | 1.00000 | |
| 18 | 26.338 | 4.643 | 1.48749 | 70.2 |
| 19 | −11.739 | 0.700 | 1.57250 | 57.8 |
| 20 | 33.041 | VARIABLE 3 | 1.00000 | |
| 21 | 16.745 | 4.400 | 1.49700 | 81.6 |
| 22 | −51.234 | 0.600 | 1.00000 | |
| 23 | 24.678 | 0.700 | 1.78472 | 25.7 |
| 24 | 10.033 | 2.495 | 1.00000 | |
| 25 | 12.870 | 3.000 | 1.65160 | 58.5 |
| 26 | −218.312 | VARIABLE 4 | 1.00000 | |
| 27 | ∞ | 1.500 | 1.51633 | 64.1 |
| 28 | ∞ | 4.694 | 1.00000 | |
| 29 | ∞(IMAGE PLANE) | | | |

| | WIDE-ANGLE END | MIDDLE | TELEPHOTO END |
|---|---|---|---|
| VARIABLE 1 | 0.605 | 16.655 | 26.341 |
| VARIABLE 2 | 26.350 | 10.300 | 0.614 |
| VARIABLE 3 | 10.891 | 7.583 | 13.783 |
| VARIABLE 4 | 10.000 | 13.308 | 7.108 |
| FOCAL LENGTH | 8.017 | 24.853 | 76.404 |
| Bf | 4.694 | 4.694 | 4.694 |
| Fno. | 1.67 | 1.90 | 2.30 |
| 2ω | 54.93 | 18.43 | 5.93 |

TABLE 9

EXAMPLE 5

| Si | Ri | Di | Ndi | νdj |
|---|---|---|---|---|
| 1 | 158.012 | 1.400 | 1.80440 | 39.6 |
| 2 | 31.104 | 7.504 | 1.48563 | 85.2 |
| 3 | −456.099 | 0.100 | 1.00000 | |
| 4 | 36.758 | 6.492 | 1.59240 | 68.3 |
| 5 | −208.639 | 0.100 | 1.00000 | |
| 6 | 31.732 | 3.091 | 1.59240 | 68.3 |
| 7 | 48.432 | VARIABLE 1 | 1.00000 | |
| 8 | 64.898 | 0.760 | 1.82481 | 42.7 |
| 9 | 10.409 | 4.678 | 1.00000 | |
| 10 | −24.672 | 1.880 | 1.84666 | 23.8 |
| 11 | −15.388 | 1.172 | 1.00000 | |
| 12 | −12.259 | 0.750 | 1.58144 | 40.7 |
| 13 | 11.89 | 2.570 | 1.84666 | 23.8 |
| 14 | 45.622 | VARIABLE 2 | 1.00000 | |
| 15 | ∞(APERTURE STOP) | 1.668 | 1.00000 | |
| 16* | 24.964 | 4.359 | 1.56865 | 58.6 |
| 17* | −80.294 | 0.450 | 1.00000 | |
| 18 | 18.053 | 4.222 | 1.48748 | 70.2 |
| 19 | −14.989 | 0.700 | 1.57250 | 57.8 |
| 20 | 15.603 | VARIABLE 3 | 1.00000 | |
| 21* | 12.951 | 4.700 | 1.49700 | 81.6 |
| 22* | −86.314 | 0.600 | 1.00000 | |
| 23 | 33.004 | 0.700 | 1.78472 | 25.7 |
| 24 | 10.910 | 1.892 | 1.00000 | |
| 25 | 13.962 | 3.000 | 1.62041 | 60.3 |
| 26 | −54.959 | VARIABLE 4 | 1.00000 | |
| 27 | ∞ | 1.500 | 1.51633 | 64.1 |
| 28 | ∞ | 4.904 | 1.00000 | |
| 29 | ∞(IMAGE PLANE) | | | |

| | WIDE-ANGLE END | MIDDLE | TELEPHOTO END |
|---|---|---|---|
| VARIABLE 1 | 1.086 | 16.770 | 26.414 |
| VARIABLE 2 | 26.369 | 10.685 | 1.041 |
| VARIABLE 3 | 11.682 | 8.254 | 15.110 |
| VARIABLE 4 | 10.000 | 13.428 | 6.572 |
| FOCAL LENGTH | 8.110 | 25.142 | 77.292 |
| Bf | 4.904 | 4.904 | 4.904 |
| Fno. | 1.67 | 1.90 | 2.37 |
| 2ω | 53.30 | 17.93 | 5.83 |

TABLE 8

EXAMPLE 4

| SURFACE | κ | A4 | A6 | A8 | A10 |
|---|---|---|---|---|---|
| 16* | 7.42986E−01 | −5.18509E−06 | −1.63748E−07 | 4.43330E−10 | 4.09389E−13 |
| 17* | 8.38616E−01 | 1.04632E−05 | −1.53813E−07 | 8.75228E−11 | −1.85260E−13 |

TABLE 10

EXAMPLE 5

| SURFACE | κ | A4 | A6 | A8 | A10 |
|---|---|---|---|---|---|
| 16* | 9.94731E-01 | 4.42790E-06 | 6.33258E-09 | 6.58666E-11 | 3.40902E-14 |
| 17* | 1.00000E+00 | 9.06233E-06 | -1.79480E-08 | -7.75564E-11 | -4.10189E-14 |
| 21* | 8.83407E-01 | -1.99286E-05 | -1.68661E-08 | 7.44960E-12 | 3.86576E-15 |
| 22* | 1.00000E+00 | 2.75531E-05 | -2.33252E-08 | -1.37516E-11 | -3.67451E-15 |

TABLE 11

EXAMPLE 6

| Si | Ri | Di | Ndi | νdj |
|---|---|---|---|---|
| 1 | 82.165 | 1.400 | 1.80610 | 40.9 |
| 2 | 29.863 | 7.047 | 1.49700 | 81.6 |
| 3 | 471.461 | 0.100 | 1.00000 | |
| 4 | 33.243 | 5.682 | 1.49700 | 81.6 |
| 5 | 835.202 | 0.100 | 1.00000 | |
| 6 | 36.624 | 3.002 | 1.49700 | 81.6 |
| 7 | 121.428 | VARIABLE 1 | 1.00000 | |
| 8 | 115.320 | 0.760 | 1.83481 | 42.7 |
| 9 | 10.510 | 4.664 | 1.00000 | |
| 10 | -25.255 | 1.880 | 1.84666 | 23.8 |
| 11 | -15.276 | 0.868 | 1.00000 | |
| 12 | -12.857 | 0.750 | 1.58144 | 40.7 |
| 13 | 12.372 | 2.570 | 1.84666 | 23.8 |
| 14 | 52.626 | VARIABLE 2 | 1.00000 | |
| 15 | ∞(APERTURE STOP) | 1.661 | 1.00000 | |
| 16* | 37.458 | 4.388 | 1.56866 | 58.6 |
| 17* | -26.304 | 0.725 | 1.00000 | |
| 18 | -56.537 | 4.000 | 1.49700 | 81.6 |
| 19 | -10.009 | 0.700 | 1.51823 | 59.0 |
| 20 | 284.457 | VARIABLE 3 | 1.00000 | |
| 21 | 22.146 | 4.700 | 1.49700 | 81.6 |
| 22 | -44.590 | 0.100 | 1.00000 | |
| 23 | 27.744 | 0.700 | 1.78472 | 25.7 |
| 24 | 11.015 | 1.480 | 1.00000 | |
| 25 | 12.597 | 3.000 | 1.65160 | 58.5 |
| 26 | -64227.000 | VARIABLE 4 | 1.00000 | |
| 27 | ∞ | 1.500 | 1.51633 | 64.1 |
| 28 | ∞ | 6.649 | 1.00000 | |
| 29 | ∞(IMAGE PLANE) | | | |

| | WIDE-ANGLE END | MIDDLE | TELEPHOTO END |
|---|---|---|---|
| VARIABLE 1 | 1.056 | 17.082 | 26.664 |
| VARIABLE 2 | 26.903 | 10.877 | 1.295 |
| VARIABLE 3 | 11.357 | 8.211 | 15.288 |
| VARIABLE 4 | 10.000 | 13.146 | 6.069 |
| FOCAL LENGTH | 8.163 | 25.307 | 77.797 |
| Bf | 6.649 | 6.649 | 6.649 |
| Fno. | 1.70 | 1.93 | 2.40 |
| 2ω | 54.51 | 18.08 | 5.81 |

TABLE 12

EXAMPLE 6

| SURFACE | κ | A4 | A6 | A8 | A10 |
|---|---|---|---|---|---|
| 16* | -2.57574E+00 | -2.41128E-05 | -2.26377E-07 | -3.14907E-09 | 1.31714E-13 |
| 17* | 6.68110E+00 | 3.21430E-05 | -5.01538E-08 | 3.29079E-10 | -1.13225E-12 |

TABLE 13

EXAMPLE 7

| Si | Ri | Di | Ndi | νdj |
|---|---|---|---|---|
| 1 | 152.310 | 1.400 | 1.72000 | 42.0 |
| 2 | 31.300 | 7.047 | 1.49700 | 81.6 |
| 3 | -437.051 | 0.100 | 1.00000 | |
| 4 | 34.338 | 5.682 | 1.49700 | 81.6 |
| 5 | -754.883 | 0.100 | 1.00000 | |
| 6 | 33.202 | 3.002 | 1.49700 | 81.6 |
| 7 | 68.761 | VARIABLE 1 | 1.00000 | |
| 8 | 115.320 | 0.760 | 1.83480 | 42.7 |
| 9 | 10.510 | 4.664 | 1.00000 | |
| 10 | -25.255 | 1.880 | 1.84666 | 23.8 |
| 11 | -15.276 | 0.868 | 1.00000 | |
| 12 | -12.857 | 0.750 | 1.58144 | 40.7 |
| 13 | 12.372 | 2.570 | 1.84665 | 23.8 |
| 14 | 52.626 | VARIABLE 2 | 1.00000 | |
| 15 | ∞(APERTURE STOP) | 1.661 | 1.00000 | |
| 16* | 37.458 | 4.388 | 1.56864 | 58.6 |
| 17* | -26.304 | 0.725 | 1.00000 | |
| 18 | -56.537 | 4.000 | 1.49700 | 81.6 |
| 19 | -10.009 | 0.700 | 1.51823 | 59.0 |
| 20 | 284.457 | VARIABLE 3 | 1.00000 | |
| 21 | 22.146 | 4.700 | 1.49700 | 81.6 |
| 22 | -44.590 | 0.100 | 1.00000 | |
| 23 | 27.744 | 0.700 | 1.76182 | 26.5 |
| 24 | 11.015 | 1.480 | 1.00000 | |
| 25 | 12.597 | 3.000 | 1.65160 | 58.5 |
| 26 | -64227.00 | VARIABLE 4 | 1.00000 | |
| 27 | ∞ | 1.500 | 1.51633 | 64.1 |
| 28 | ∞ | 6.668 | 1.00000 | |
| 29 | ∞(IMAGE PLANE) | | | |

| | WIDE-ANGLE END | MIDDLE | TELEPHOTO END |
|---|---|---|---|
| VARIABLE 1 | 1.056 | 17.273 | 27.126 |
| VARIABLE 2 | 26.903 | 10.686 | 0.833 |
| VARIABLE 3 | 10.305 | 8.027 | 14.783 |
| VARIABLE 4 | 10.000 | 13.330 | 6.574 |
| FOCAL LENGTH | 8.056 | 25.291 | 77.748 |
| Bf | 6.668 | 5.728 | 5.728 |
| Fno. | 1.71 | 1.95 | 2.40 |
| 2ω | 55.18 | 18.32 | 5.90 |

TABLE 14

EXAMPLE 7

| SURFACE | κ | A4 | A6 | A8 | A10 |
|---|---|---|---|---|---|
| 16* | −2.57574E+00 | −2.41128E−05 | −2.26377E−07 | −3.14907E−09 | 1.31714E−13 |
| 17* | 6.68110E+00 | 3.21430E−05 | −5.01538E−08 | 3.29079E−10 | −1.13225E−12 |

TABLE 15

EXAMPLE 8

| Si | Ri | Di | Ndi | vdj |
|---|---|---|---|---|
| 1 | 66.199 | 1.400 | 1.88300 | 40.8 |
| 2 | 28.949 | 6.500 | 1.49700 | 81.6 |
| 3 | 169.754 | 0.100 | 1.00000 | |
| 4 | 33.192 | 6.000 | 1.49700 | 81.6 |
| 5 | −326.832 | 0.100 | 1.00000 | |
| 6 | 33.474 | 3.002 | 1.49700 | 81.6 |
| 7 | 75.494 | VARIABLE 1 | 1.00000 | |
| 8 | 115.320 | 0.760 | 1.83480 | 42.7 |
| 9 | 10.510 | 4.664 | 1.00000 | |
| 10 | −25.255 | 1.880 | 1.84666 | 23.8 |
| 11 | −15.276 | 0.868 | 1.00000 | |
| 12 | −12.857 | 0.750 | 1.58144 | 40.7 |
| 13 | 12.372 | 2.570 | 1.84665 | 23.8 |
| 14 | 52.626 | VARIABLE 2 | 1.00000 | |
| 15 | ∞(APERTURE STOP) | 1.661 | 1.00000 | |
| 16* | 20.558 | 4.388 | 1.49700 | 81.6 |
| 17* | −39.69 | 0.725 | 1.00000 | |
| 18 | 51.834 | 4.000 | 1.57135 | 53.0 |
| 19 | −9.542 | 0.700 | 1.53172 | 48.9 |
| 20 | 16.960 | VARIABLE 3 | 1.00000 | |
| 21 | 17.32 | 4.700 | 1.49700 | 81.6 |
| 22 | −99.657 | 0.100 | 1.00000 | |
| 23 | 27.005 | 0.700 | 1.76182 | 26.5 |
| 24 | 10.996 | 1.480 | 1.00000 | |
| 25 | 12.881 | 3.000 | 1.65160 | 58.5 |
| 26 | −105.171 | VARIABLE 4 | 1.00000 | |
| 27 | ∞ | 1.500 | 1.51633 | 64.1 |
| 28 | ∞ | 5.083 | 1.00000 | |
| 29 | ∞(IMAGE PLANE) | | | |

| | WIDE-ANGLE END | MIDDLE | TELEPHOTO END |
|---|---|---|---|
| VARIABLE 1 | 1.056 | 17.195 | 26.837 |
| VARIABLE 2 | 26.903 | 10.764 | 1.122 |
| VARIABLE 3 | 10.305 | 8.125 | 14.870 |
| VARIABLE 4 | 10.000 | 13.232 | 6.487 |
| FOCAL LENGTH | 8.204 | 25.431 | 78.180 |
| Bf | 5.083 | 5.083 | 5.728 |
| Fno. | 1.65 | 1.79 | 2.40 |
| 2ω | 54.23 | 18.02 | 5.81 |

TABLE 16

EXAMPLE 8

| SURFACE | κ | A4 | A6 | A8 | A10 |
|---|---|---|---|---|---|
| 16* | −4.24184E+00 | 4.28474E−05 | −2.26377E−07 | −3.14907E−09 | 1.31714E−13 |
| 17* | 8.56119E+00 | 4.18178E−05 | −5.01538E−08 | 3.29079E−10 | −1.13225E−12 |

TABLE 17

EXAMPLE 9

| Si | Ri | Di | Ndi | vdj |
|---|---|---|---|---|
| 1 | 54.902 | 1.400 | 1.80100 | 35.0 |
| 2 | 30.826 | 6.500 | 1.43875 | 95.0 |
| 3 | 233.979 | 0.100 | 1.00000 | |
| 4 | 33.189 | 6.000 | 149700 | 81.6 |
| 5 | 923.883 | 0.100 | 1.00000 | |
| 6 | 36.267 | 3.002 | 1.49700 | 81.6 |
| 7 | 63.280 | VARIABLE 1 | 1.00000 | |
| 8 | 346.000 | 0.760 | 1.83481 | 42.7 |
| 9 | 9.819 | 3.795 | 1.00000 | |
| 10 | −26.780 | 1.880 | 1.83481 | 42.7 |
| 11 | −18.892 | 0.974 | 1.00000 | |
| 12 | −18.689 | 0.750 | 1.60562 | 43.7 |
| 13 | 11.457 | 2.570 | 1.84666 | 23.8 |
| 14 | 73.167 | VARIABLE 2 | 1.00000 | |
| 15 | ∞(APERTURE STOP) | 1.661 | 1.00000 | |
| 16* | 37.458 | 4.388 | 1.56866 | 58.6 |
| 17* | −26.304 | 0.725 | 1.00000 | |
| 18 | −56.537 | 4.000 | 1.49700 | 81.6 |
| 19 | −10.009 | 0.700 | 1.51823 | 59.0 |
| 20 | 284.457 | VARIABLE 3 | 1.00000 | |
| 21 | 22.146 | 4.700 | 1.49700 | 81.6 |
| 22 | −44.590 | 0.100 | 1.00000 | |
| 23 | 27.744 | 0.700 | 1.76182 | 26.5 |
| 24 | 11.015 | 1.480 | 1.00000 | |
| 25 | 12.597 | 3.000 | 1.65160 | 58.5 |
| 26 | −64227.000 | VARIABLE 4 | 1.00000 | |
| 27 | ∞ | 1.500 | 1.51633 | 64.1 |
| 28 | ∞ | 6.397 | 1.00000 | |
| 29 | ∞(IMAGE PLANE) | | | |

| | WIDE-ANGLE END | MIDDLE | TELEPHOTO END |
|---|---|---|---|
| VARIABLE 1 | 1.056 | 17.375 | 27.167 |
| VARIABLE 2 | 27.447 | 11.020 | 1.228 |
| VARIABLE 3 | 11.357 | 8.250 | 14.870 |
| VARIABLE 4 | 10.000 | 13.107 | 6.374 |
| FOCAL LENGTH | 8.258 | 25.601 | 78.702 |
| Bf | 6.397 | 6.397 | 6.397 |
| Fno. | 1.69 | 1.91 | 2.40 |
| 2ω | 54.33 | 17.95 | 5.76 |

TABLE 18

EXAMPLE 9

| SURFACE | κ | A4 | A6 | A8 | A10 |
|---|---|---|---|---|---|
| 16* | −2.57574E+00 | −2.41128E−05 | −2.26377E−07 | −3.14907E−09 | 1.31714E−13 |
| 17* | 6.68110E+00 | 3.21430E−05 | −5.01538E−08 | 3.29079E−10 | −1.13225E−12 |

Table 19 shows correspondence values and related values for formulas (1) through (12) of the variable magnification optical systems in Examples 1 through 9. In all of the examples, d-line is a reference wavelength. The tables of data on variable magnification and the following Table 19 show values at the reference wavelength.

TABLE 19

| FORMULA | EXAMPLE 1 | EXAMPLE 2 | EXAMPLE 3 | EXAMPLE 4 | EXAMPLE 5 | EXAMPLE 6 | EXAMPLE 7 | EXAMPLE 8 | EXAMPLE 9 |
|---|---|---|---|---|---|---|---|---|---|
| (1) f3/fw | 4.63 | 4.30 | 4.59 | 5.00 | 5.46 | 5.03 | 5.10 | 4.86 | 4.98 |
| (2) f31p/f3 | 1.04 | 0.67 | 0.87 | 0.89 | 0.77 | 0.68 | 0.68 | 0.70 | 0.68 |
| (3) f3/f3C | −0.10 | −0.60 | −0.27 | −0.17 | −0.52 | −0.53 | −0.60 | −0.61 | −0.46 |
| (4) ν 3Cn | 64.1 | 59.0 | 61.2 | 57.8 | 57.8 | 59.0 | 59.0 | 48.9 | 59.0 |
| ν 3Cp | 81.6 | 81.6 | 81.6 | 70.2 | 70.2 | 81.6 | 81.6 | 53.0 | 81.6 |
| (5) |f2|/fw | 1.20 | 1.13 | 1.20 | 1.26 | 1.25 | 1.27 | 1.28 | 1.26 | 1.28 |
| (6) ν 2p | 23.8 | 55.5 | 23.8 | 23.8 | 23.8 | 23.8 | 23.8 | 23.8 | 42.7 |
| (7) dz2/fw | 3.12 | 3.07 | 3.07 | 3.21 | 3.12 | 3.14 | 3.55 | 3.48 | 3.52 |
| (8) |f1n|/f1 | 1.55 | 1.53 | 1.54 | 1.43 | 1.48 | 1.29 | 1.20 | 1.28 | 1.25 |
| (9) N1n | 1.83400 | 1.83400 | 1.83400 | 1.80440 | 1.80440 | 1.80610 | 1.72000 | 1.88300 | 1.80100 |
| (10) ν 1n | 37.2 | 37.2 | 37.2 | 39.6 | 39.6 | 40.9 | 42.0 | 40.8 | 35.0 |
| (11) f4pF/f4pR | 1.04 | 1.46 | 1.46 | 1.38 | 1.26 | 1.58 | 1.46 | 1.69 | 1.58 |
| (12) f4n/f4 | −0.90 | −0.89 | −0.93 | −0.93 | −1.03 | −0.99 | −0.89 | −1.12 | −0.99 |

FIG. 11, Sections A through I show aberration diagrams of the variable magnification optical system in Example 1. FIG. 11, Sections A, B and C illustrate a spherical aberration, curvature of field and distortion aberration (distortion) at a wide-angle end, respectively. FIG. 11, Sections D, E and F illustrate a spherical aberration, curvature of field and distortion aberration (distortion) in a middle focal length state, respectively. FIG. 11, Sections G, H and I illustrate a spherical aberration, curvature of field and distortion aberration (distortion) at a telephoto end, respectively.

In the diagram of the spherical aberration, an aberration for d-line is indicated by a solid line, and an aberration for g-line (wavelength of 435.8 nm) is indicated by a broken line. Further, an aberration for C-line (wavelength of 656.3 nm) is indicated by a dashed line, and an aberration for the wavelength of 880 nm is indicated by a dot-dashed line. In the diagram of curvature of field, aberrations for d-line, g-line and C-line are illustrated, and an aberration in a sagittal direction is indicated by a solid line, and an aberration in a tangential direction is indicated by a broken line. The diagram of distortion aberration illustrates an aberration for d-line. The vertical axis of the diagram of spherical aberration corresponds to F-number. In the diagrams of curvature of field and distortion, the vertical axis represents image height (unit is mm), and the minimum value of the vertical axis is 0.

Since the image height of 0 represents a position on an optical axis, the value of curvature of field in the sagittal direction and the value of curvature of field in the tangential direction at the image height of 0 are the same. In the diagram of curvature of field, aberration curves for wavelengths at the image height of 0 are positioned in the same order as aberration curves for wavelengths at the lowest position of the vertical axis in the diagram of a spherical aberration. For example, when aberration curves for d-line, g-line and C-line are positioned in this order from the left side at the lowest position of the vertical axis in the diagram of a spherical aberration, aberration curves at the position of the image height of 0 in the diagram of curvature of field in the same variable magnification state are positioned in a similar order, and an aberration curve in a sagittal direction and a tangential direction for d-line, an aberration curve in a sagittal direction and a tangential direction for g-line, and an aberration curve in a sagittal direction and a tangential direction for C-line are positioned in this order from the left side.

Here, the diagram of distortion is represented by TV distortion. When a planar object is perpendicular to an optical axis, and an optical system forms an image of the planar object, the degree of distortion of the object image in a direction perpendicular to the optical axis is represented as distortion. Lenses for photography and the like use a general numerical value obtained by dividing a difference between an ideal image height and an actual image height by the ideal image height, and by expressing the obtained value in percentage. However, the fields of TV lenses use a different definition expression, which is distinguished as TV distortion. According to the definition, an amount of curvature of a long side of a TV screen is used, as a target of a distortion amount.

Specifically, TV distortion DTV is obtained by dividing depth Δh of curvature of a long side by vertical screen length 2h, and by expressing the obtained value in percentage. TV distortion DTV is represented by the following expression:

$$DTV = \Delta h/2h \times 100.$$

In a diagram of distortion, actual image height Y from an optical axis is lengths to four points in four diagonal directions of a screen from the optical axis, and a rectangular planar object on an object side of a planar image connecting the four points is assumed. An actual image height at the center of a long side of the image is h, and a difference from a perpendicular height of a point on a diagonal line to the optical axis is Δh. Therefore, the numerical value varies depending on the aspect ratio of a screen. In the diagrams of distortion illustrated in FIG. 11, Sections C, F and I, distortion is calculated based on the ratio of 3:4, which is a general ratio for a TV screen.

Figure 14:
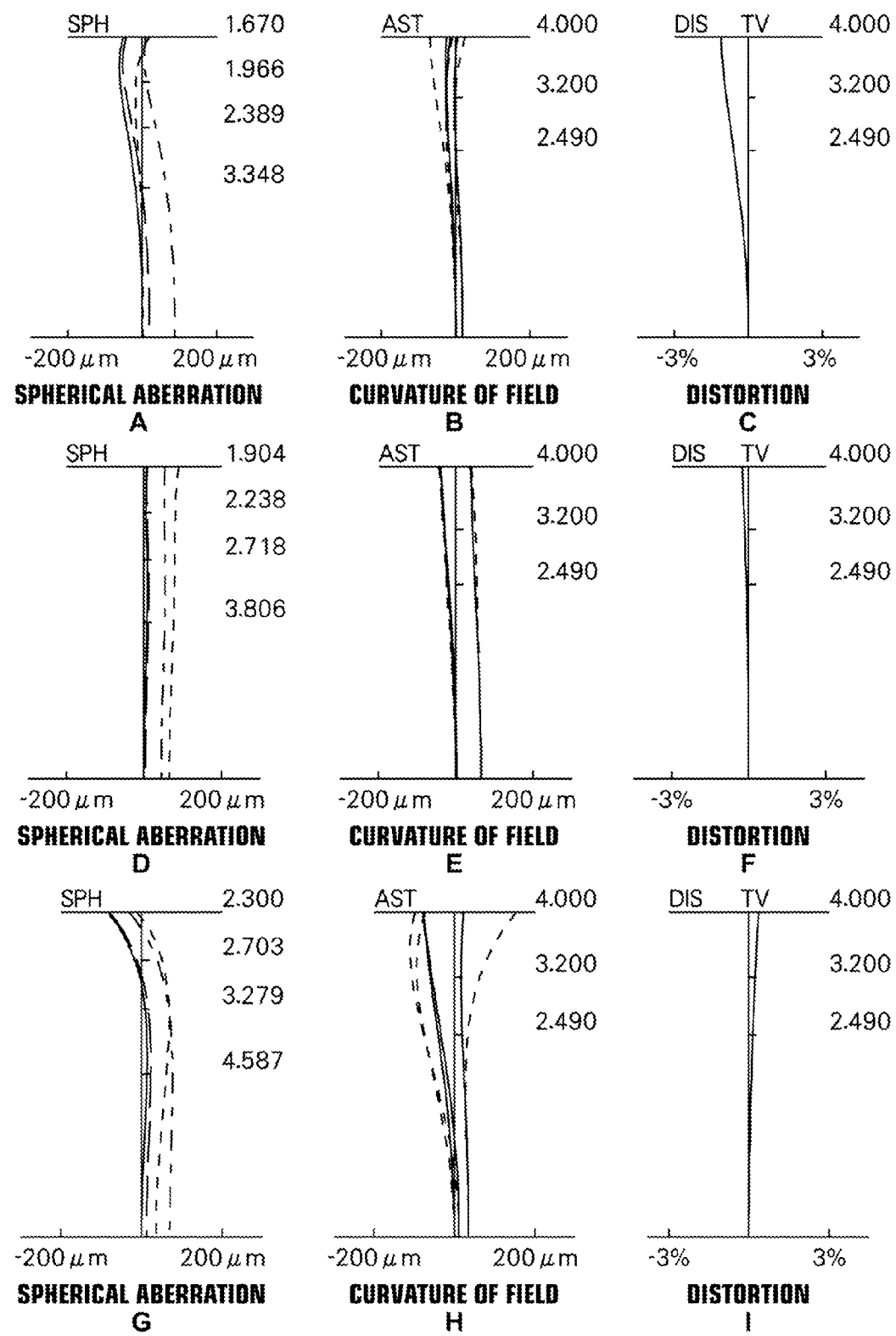
FIG. 14, Sections A through I are aberration diagrams of the variable magnification optical system in Example 4 of the present invention.
Figure 15:
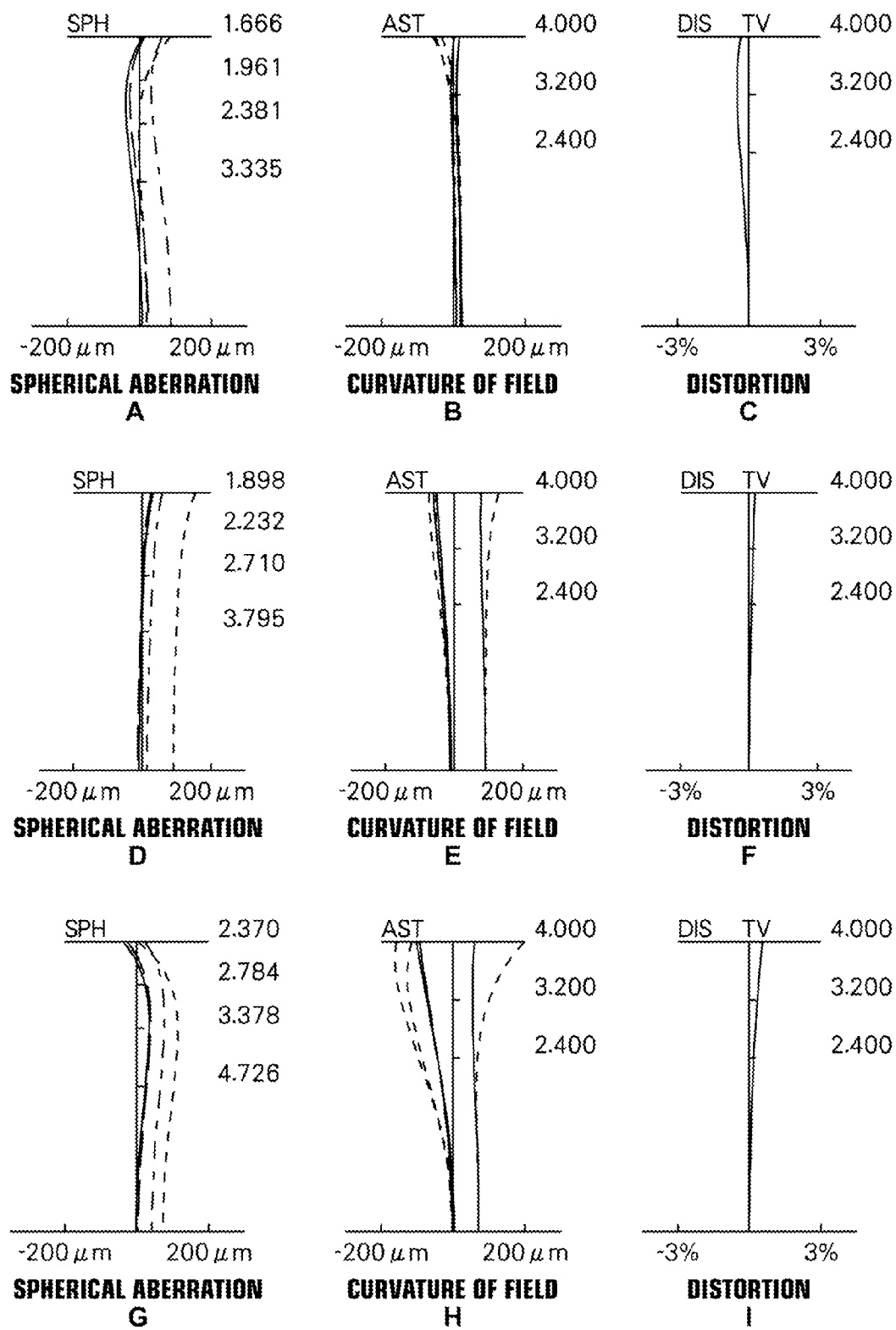
FIG. 15, Sections A through I are aberration diagrams of the variable magnification optical system in Example 5 of the present invention.
Figure 16:
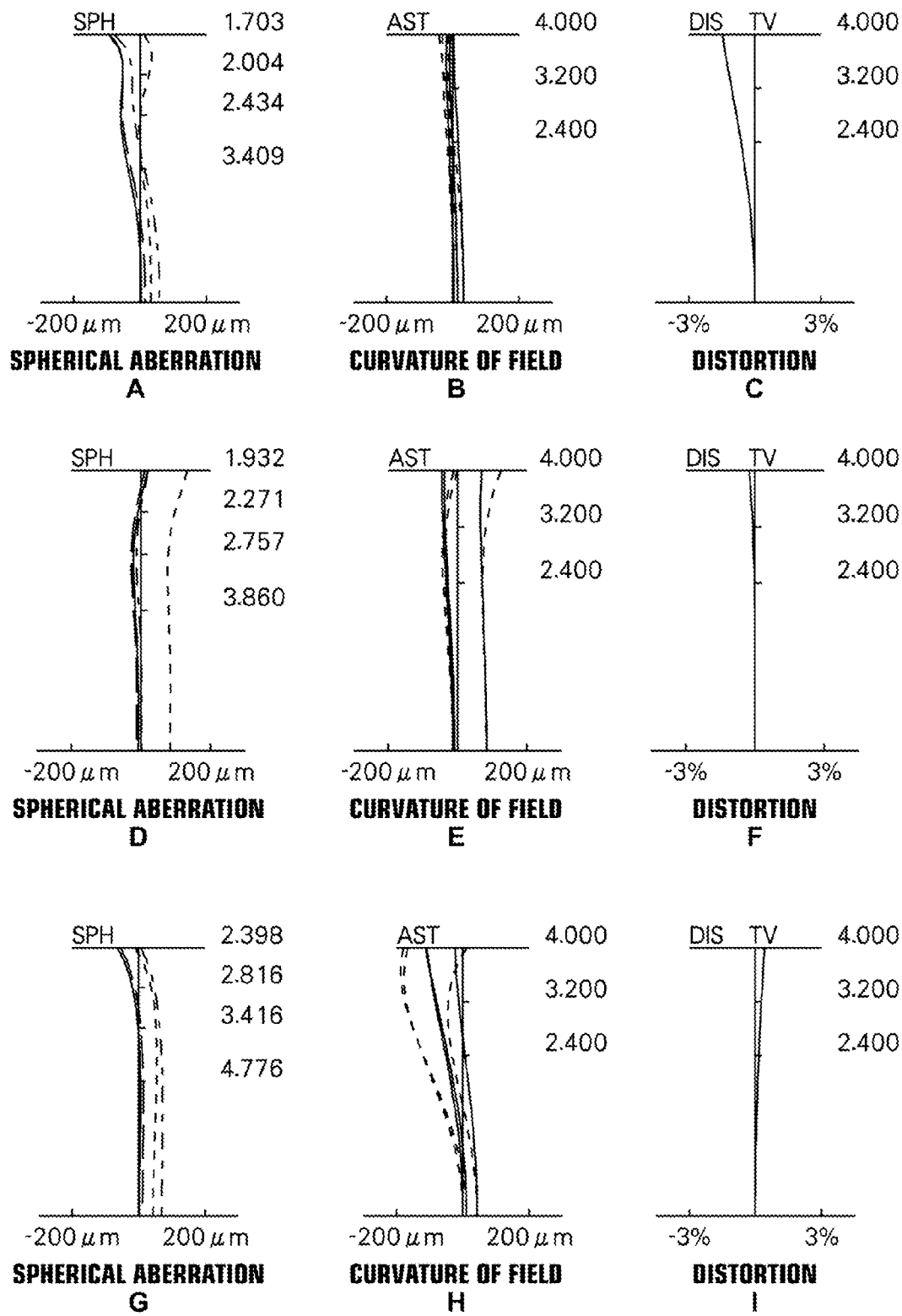
FIG. 16, Sections A through I are aberration diagrams of the variable magnification optical system in Example 6 of the present invention.
Figure 17:
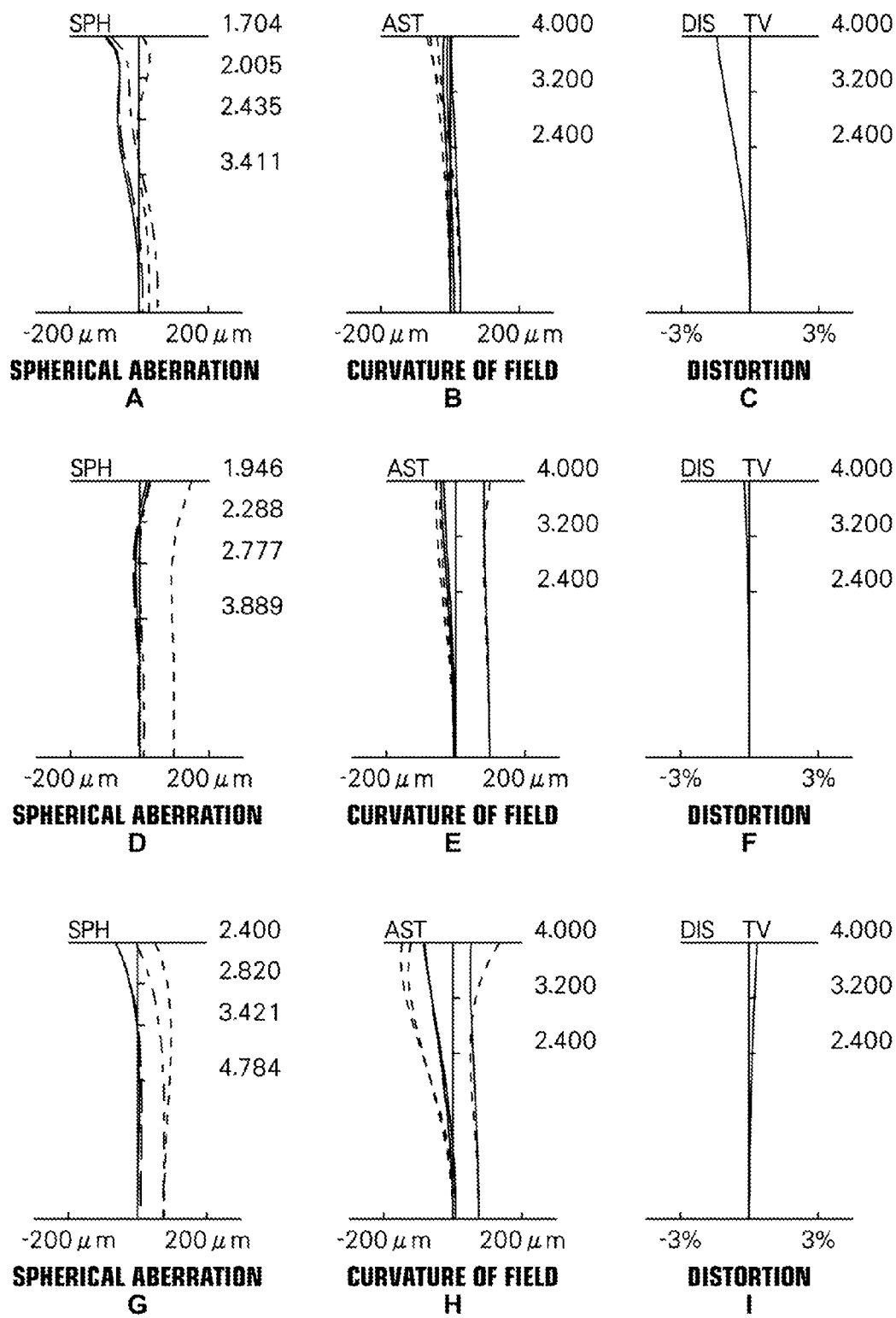
FIG. 17, Sections A through I are aberration diagrams of the variable magnification optical system in Example 7 of the present invention.
Figure 18:
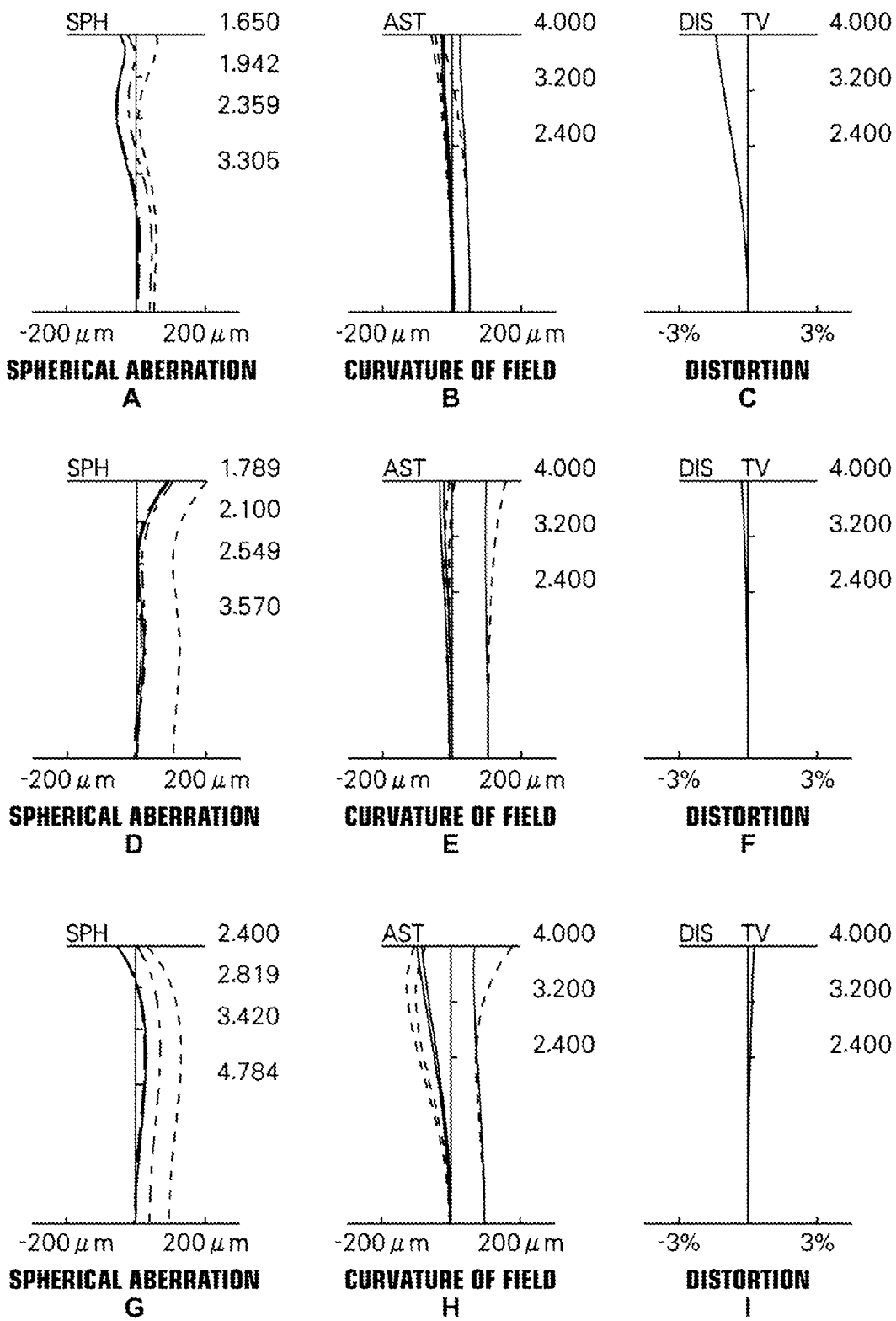
FIG. 18, Sections A through I are aberration diagrams of the variable magnification optical system in Example 8 of the present invention.
Figure 19:
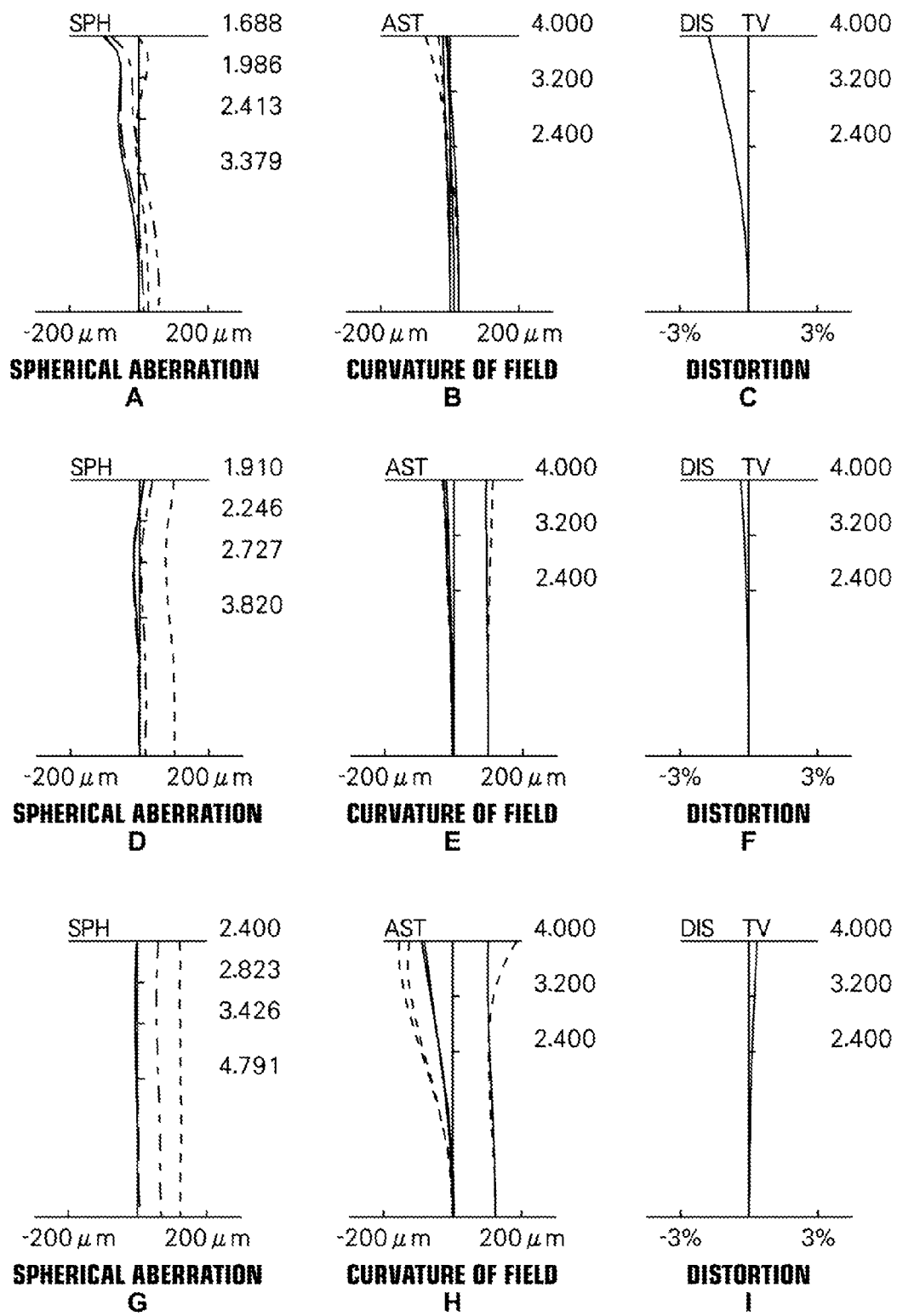
FIG. 19, Sections A through I are aberration diagrams of the variable magnification optical system in Example 9 of the present invention.

Similarly, FIG. 12, Sections A through I show aberration diagrams of the variable magnification optical system in Example 2 at a wide-angle end, in a middle focal length state, and at a telephoto end. FIG. 13, Sections A through I show aberration diagrams of the variable magnification optical system in Example 3 at a wide-angle end, in a middle focal length state, and at a telephoto end. FIG. 14, Sections A through I show aberration diagrams of the variable magnification optical system in Example 4 at a wide-angle end, in a middle focal length state, and at a telephoto end. FIG. 15, Sections A through I show aberration diagrams of the variable magnification optical system in Example 5 at a wide-angle end, in a middle focal length state, and at a telephoto end. FIG. 16, Sections A through I show aberration diagrams of the variable magnification optical system in Example 6 at a wide-angle end, in a middle focal length state, and at a telephoto end. FIG. 17, Sections A through I show aberration diagrams of the variable magnification optical system in Example 7 at a wide-angle end, in a middle focal length state, and at a telephoto end. FIG. 18, Sections A through I show aberration diagrams of the variable magnification optical system in Example 8 at a wide-angle end, in a middle focal length state, and at a telephoto end. FIG. 19, Sections A through I show aberration diagrams of the variable magnification optical system in Example 9 at a wide-angle end, in a middle focal length state, and at a telephoto end.

Figure 20:
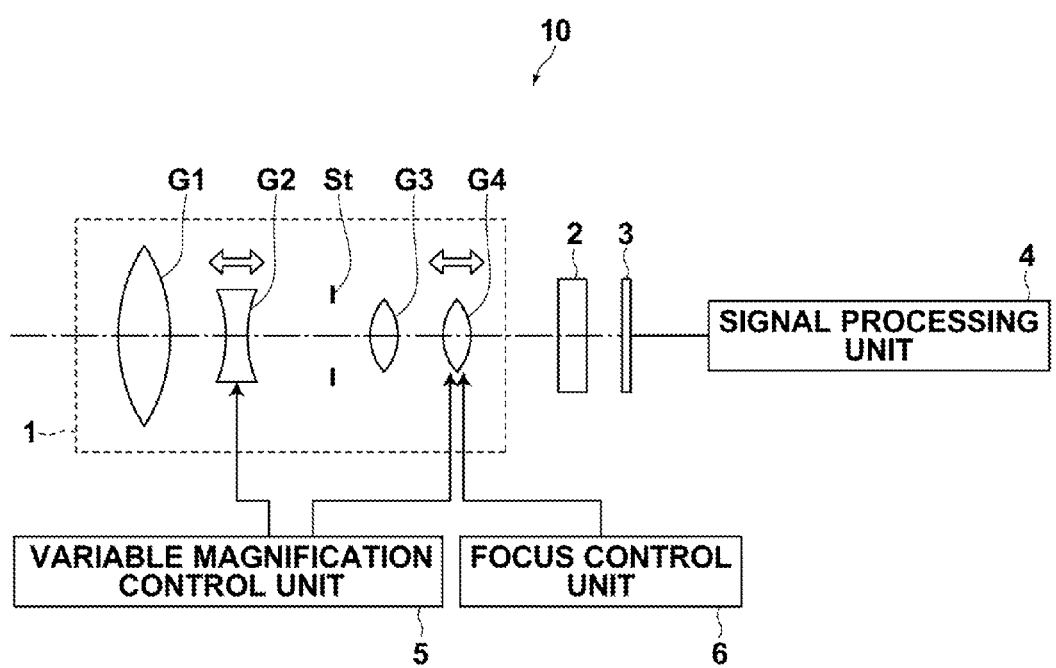
FIG. 20 is a schematic diagram illustrating the configuration of an imaging apparatus according to an embodiment of the present invention.

Next, an imaging apparatus according to an embodiment of the present invention will be described. FIG. 20 is a schematic diagram illustrating the configuration of an imaging apparatus 10 using the variable magnification optical system 1 according to an embodiment of the present invention, as an example of an imaging apparatus according to an embodiment of the present invention. The imaging apparatus is, for example, a surveillance camera, a video camera, an electronic still camera, or the like.

The imaging apparatus 10 illustrated in FIG. 20 includes the variable magnification optical system 1, a filter 2 arranged on the image side of the variable magnification optical system 1, an imaging device 3 that images an image of a subject formed by the variable magnification optical system, a signal processing unit 4 that performs operation processing on a signal output from the imaging device 3, a variable magnification control unit 5 for changing magnification of the variable magnification optical system 1 and a focus control unit 6 for adjusting focus.

The variable magnification optical system 1 includes positive first lens group G1 that is fixed during magnification change, negative second lens group G2 that moves along optical axis Z during magnification change, aperture stop St, positive third lens group G3 that is fixed during magnification change, and positive fourth lens group G4 that moves along optical axis Z during focus adjustment. In FIG. 20, these lens groups are schematically illustrated. The imaging device 3 images an optical image formed by the variable magnification optical system 1, and converts the optical image into electrical signals. The imaging device 3 is placed in such a manner that the imaging surface of the imaging device 3 and the image plane of the variable magnification optical system become the same. For example, a CCD, a CMOS or the like may be used as the imaging device 3.

So far, the present invention has been described by using embodiments and examples. However, the present invention is not limited to the embodiments nor the examples, and various modifications are possible. For example, values, such as the curvature radius of each lens element, distances between surfaces, refractive indices, Abbe numbers and aspheric coefficients, are not limited to the values in the numerical value examples, but may be other values.

What is claimed is:

1. A variable magnification optical system comprising:
a first lens group having positive refractive power;
a second lens group having negative refractive power;
a stop;
a third lens group having positive refractive power; and
a fourth lens group having positive refractive power, which are in this order from an object side,
wherein the first lens group, the stop and the third lens group are fixed relative to an image plane, but the second lens group and the fourth lens group move in an optical axis direction during magnification change, and
wherein the fourth lens group has a focusing function, and
wherein the third lens group includes at least an aspherical surface, and consists of, in the following order from the object side, a positive lens and a cemented lens of a positive lens and a double-concave lens cemented together, and
wherein the following formulas (1) through (4) are satisfied:

$$3.5 < f3/fw < 6 \quad (1);$$

$$0.4 < f31p/f3 < 1.2 \quad (2);$$

$$-0.8 < f3/f3C < 0.1 \quad (3); \text{ and}$$

$$45 < v3Cn < v3Cp \quad (4), \text{ where}$$

f3: a focal length of the third lens group,
fw: a focal length of the entire system at a wide-angle end,
f31p: a focal length of the positive lens on the most object side in the third lens group,
f3C: a focal length of the cemented lens,
v3Cn: an Abbe number of the double-concave lens constituting the cemented lens for d-line, and
v3Cp: an Abbe number of the positive lens constituting the cemented lens for d-line.

2. The variable magnification optical system, as defined in claim 1, wherein the following formula (4-1) is satisfied:

$$55 < v3Cn < v3Cp \quad (4\text{-}1).$$

3. The variable magnification optical system, as defined in claim 1, wherein the absolute value of the curvature radius of an image-side surface of the double-concave lens in the third lens group is greater than the absolute value of the curvature radius of an object-side surface of the double-concave lens.

4. The variable magnification optical system, as defined in claim 1, wherein the second lens group consists of a negative lens, a positive meniscus lens having a concave object-side surface, a double-concave lens and a positive lens, which are in this order from the object side, and
wherein the following formulas (5) through (7) are satisfied:

$$1.0 < |f2|/fw < 1.4 \quad (5);$$

$$20 < v2p < 60 \quad (6); \text{ and}$$

$$2.8 < dz2/fw < 3.5 \quad (7), \text{ where}$$

f2: a focal length of the second lens group,
v2p: an Abbe number of the positive meniscus lens in the second lens group for d-line, and dz2: the movement amount of the second lens group in the optical axis direction when magnification is changed from a wide-angle end to a telephoto end.

5. The variable magnification optical system, as defined in claim 4, wherein the following formula (6-1) is satisfied:

$$20 < v2p < 45 \tag{6-1}$$

6. The variable magnification optical system, as defined in claim 1, wherein the first lens group consists of a negative lens having a concave image-side surface and three positive lenses having concave image-side surfaces in this order from the object side, and wherein the following formulas (8) through (10) are satisfied:

$$1.0 < |f1n|/f1 < 2.6 \tag{8}$$

$$1.7 < N1n < 2.0 \tag{9); and}$$

$$33 < v1n < 43 \tag{10), where}$$

f1n: a focal length of the negative lens in the first lens group,
f1: a focal length of the first lens group,
N1n: a refractive index of the negative lens in the first lens group for d-line, and
v1n: an Abbe number of the negative lens in the first lens group for d-line.

7. The variable magnification optical system, as defined in claim 6, wherein the following formula (9-1) is satisfied:

$$1.8 < N1n < 2.0 \tag{9-1}$$

8. The variable magnification optical system, as defined in claim 1, wherein the fourth lens group consists of a double-convex lens, a negative meniscus lens having a concave image-side surface and a positive lens in this order from the object side, and wherein the following formulas (11) and (12) are satisfied:

$$0.8 < f4pF/f4pR < 2.0 \tag{11); and}$$

$$-1.3 < f4n/f4 < -0.6 \tag{12), where}$$

f4pF: a focal length of the double-convex lens in the fourth lens group,
f4pR: a focal length of the positive lens on the most image side in the fourth lens group,
f4n: a focal length of the negative meniscus lens in the fourth lens group, and
f4: a focal length of the fourth lens group.

9. An imaging apparatus comprising:
the variable magnification optical system, as defined in claim 1.

* * * * *